United States Patent
Becker et al.

(10) Patent No.: US 11,082,234 B2
(45) Date of Patent: Aug. 3, 2021

(54) METHOD AND SYSTEM FOR PRIVACY-PRESERVING SOCIAL MEDIA ADVERTISING

(71) Applicant: Robert Bosch GmbH, Stuttgart (DE)

(72) Inventors: Daniela Becker, Pittsburgh, PA (US); Jorge Guajardo Merchan, Pittsburgh, PA (US)

(73) Assignee: Robert Bosch GmbH, Stuttgart (DE)

(*) Notice: Subject to any disclaimer, the term of this patent is extended or adjusted under 35 U.S.C. 154(b) by 429 days.

(21) Appl. No.: 16/029,113

(22) Filed: Jul. 6, 2018

(65) Prior Publication Data

US 2019/0013950 A1    Jan. 10, 2019

Related U.S. Application Data

(60) Provisional application No. 62/529,232, filed on Jul. 6, 2017.

(51) Int. Cl.
*G06F 21/32* (2013.01)
*H04L 9/32* (2006.01)
(Continued)

(52) U.S. Cl.
CPC ............ *H04L 9/3247* (2013.01); *H04L 9/008* (2013.01); *H04L 9/0618* (2013.01);
(Continued)

(58) Field of Classification Search
CPC ... H04L 9/3247; H04L 9/3093; H04L 9/0618; H04L 9/008; G06Q 30/0277; G06Q 2220/10
See application file for complete search history.

(56) References Cited

U.S. PATENT DOCUMENTS 8,555,400 B2    10/2013  Shi et al.
8,909,711 B1 *  12/2014  Staddon ................. G06Q 50/01
                                                         709/205
(Continued)

FOREIGN PATENT DOCUMENTS

WO    2014030706 A1    2/2014

OTHER PUBLICATIONS

Valovich et al., arXiv.org, Jul. 29, 2015, "Privacy Stream Aggregation Protocol", pp. 1-33 teaches the fundamentals of PSA (privacy stream aggregation).*

(Continued)

*Primary Examiner* — Theodore C Parsons
*Assistant Examiner* — Thomas Ho
(74) *Attorney, Agent, or Firm* — Maginot, Moore & Beck LLP

(57) ABSTRACT

A method for operating an aggregator in an electronic commerce system includes receiving ciphertexts and signatures transmitted from multiple clients, each ciphertext encrypting noisy plaintext data of a category of information for a user that purchased a product, generating sums of the ciphertexts and the signatures, verifying the sum of the ciphertexts with a homomorphic signature system based on the sum of the signatures and homomorphic verification data, decrypting the sum of the ciphertexts in a private stream aggregation (PSA) process based on homomorphic decryption data to generate a sum of noisy plaintext data in response to a success of the verification, and identifying aggregate statistical information transmitted from the clients based on the sum of noisy plaintext data while preserving differential privacy of the clients.

16 Claims, 8 Drawing Sheets

(51) Int. Cl.
H04L 9/06 (2006.01)
H04L 9/00 (2006.01)
H04L 9/30 (2006.01)
G06Q 30/02 (2012.01)

(52) U.S. Cl.
CPC ....... *H04L 9/3093* (2013.01); *G06Q 30/0277* (2013.01); *G06Q 2220/10* (2013.01)

(56) References Cited

U.S. PATENT DOCUMENTS

| | | | |
|---|---|---|---|
| 9,641,318 | B2 | 5/2017 | Patel et al. |
| 10,833,841 | B2* | 11/2020 | Kerschbaum ....... G06F 21/6227 |
| 2006/0085651 | A1* | 4/2006 | Staddon ................ H04L 9/0894 713/193 |
| 2009/0182667 | A1* | 7/2009 | Parkes .................. H04L 9/3033 705/50 |
| 2011/0243320 | A1* | 10/2011 | Halevi .................. H04L 9/0861 380/30 |
| 2011/0283099 | A1* | 11/2011 | Nath ....................... H04L 9/008 713/150 |
| 2012/0143922 | A1* | 6/2012 | Rane ...................... G06Q 10/00 707/803 |
| 2012/0204026 | A1* | 8/2012 | Shi ......................... H04L 9/088 713/155 |
| 2013/0275743 | A1* | 10/2013 | Jawurek ................ H04L 9/008 713/150 |
| 2013/0318351 | A1* | 11/2013 | Hirano .................. H04L 9/3231 713/168 |
| 2014/0237254 | A1 | 8/2014 | Joye et al. |
| 2015/0236849 | A1* | 8/2015 | Ayday .................... H04L 9/0819 713/193 |
| 2015/0295716 | A1* | 10/2015 | Liu ........................ H04L 9/0618 713/191 |
| 2016/0004874 | A1* | 1/2016 | Ioannidis ............... G06F 17/16 713/165 |
| 2016/0224803 | A1* | 8/2016 | Frank ................ G06F 16/24578 |
| 2017/0243028 | A1* | 8/2017 | LaFever ............. G06F 21/6263 |

OTHER PUBLICATIONS

Chan et al, 2011, "Privacy Preserving Stream Aggregation with Fault Tolerance", pp. 1-20.*
International Search Report and Written Opinion corresponding to International Patent Application No. PCT/US2018/041110 (12 pages).
Shi, Elaine et al., "Privacy-Preserving Aggregation of Time-Series Data," Network and Distributed System Security Symposium (NDSS), 2011 (17 pages).
Bansarkhani, Rachid et al., "Augmented Learning with Errors: The Untapped Potential of the Error Term," Financial Cryptography and Data Security: 19th International Conference, FC 2015 (27 pages).
Jing, Zhengjun, "An Efficient Homomorphic Aggregate Signature Scheme Based on Lattice," Mathematical Problems in Engineering vol. 2014, Nov. 6, 2014 (10 pages).
Zhang, Peng, et al. "A Homomorphic Aggregate Signature Scheme Based on Lattice," Chinese Journal of Electronics vol. 21, No. 4, Oct. 2012 (4 pages).
Becker, D. et al., "Towards A New Privacy-Preserving Social Media Advertising Architecture (Invited Position Paper)," 2017 IEEE Conference on Communications and Network Security (CNS): SPA, 465-466 (2 pages).
Becker, D. et al., "SOMAR: Privacy-Preserving SOcial Media Advertising ARchitecture," WPES'17, Session 1: Social Systems and Notifications, Oct. 30, 2017, 21-30 (10 pages).
Raphelson, S., "Amid The Stereotypes, Some Facts About Millennials," NCPR: North Country Public Radio, 2014. [Online]. Available: https://www.northcountrypublicradio.org/news/npr/354196302/amid-the-stereotypes-some-facts-about-millennials (3 pages).
Rouse, M., "Millennials (Generation Y)," What.Is.com, 2015, [Online]. Available: http://whatis.techtarget.com/definition/millennials-millennial-generation (4 pages).
Deutsch, J., "Millennials Are Changing The World Of Advertising," DigitalDoughnut, 2016, Available: https://www.digitaldoughnut.com/articles/2016/may/millennials-are-changing-the-world-of-advertising (5 pages).
G. S. G. I. Research, "Millennials: Coming of Age," GoldmanSachs.com, 2017, Available: https://www.goldmansachs.com/insights/archive/millennials/ (5 pages).
N. P. R. (NPR), "How Do You Market to Millennials?," New Boom, transcript of audio, 2015, Available: https://www.npr.org/transcripts/388592666 (5 pages).
Fleming, J. H. et al., "Data Security: Not a Big Concern for Millennials," Gallup, 2016, Available: https://news.gallup.com/businessjournal/192401/data-security-not-big-concern-millennials.aspx (4 pages).
Dwork, C. et al., "The Algorithmic Foundations of Differential Privacy," Foundations and Trends in Theoretical Computer Science, 2014, vol. 9, Nos. 3-4 (281 pages).
Shi, E. et al., "Privacy-Preserving Aggregation of Time-Series Data," in Proc. Netw. Distrib. Syst. Secur. Symp. NDSS 2011, 2011, Available: https://www.ndss-symposium.org/wp-content/uploads/2017/09/shi.pdf (17 pages).
Emura, K., "Privacy-Preserving Aggregation of Time-Series Data with Public Verifiability from Simple Assumptions," 2017, Available: https://eprint.iacr.org/2017/479.pdf (18 pages).
Fredrikson, M. et al., "Privacy in Pharmacogenetics: An End-to-End Case Study of Personalized Warfarin Dosing," 23rd USENIX Security Symposium, USENIX Association, 2014, 17-32 (16 pages).
Jawurek, I. et al., "SoK: Privacy Technologies for Smart Grids—A Survey of Options.," 2012, Available: https://www.microsoft.com/en-us/research/wp-content/uploads/2012/11/paper.pdf (16 pages).
Leontiadis, I. et al., "PUDA—Privacy and Unforgeability for Data Aggregation," in Cryptol. Netw. Secur. Springer, Cham, 2015, Available: https://eprint.iacr.org/2015/562.pdf (19 pages).
Paillier, P., "Public-Key Cryptosystems Based on Composite Degree Residuosity Classes," EUROCRYPT'99, 1999 LNCS 1592, pp. 223-238 (16 pages).
Valovich, F., "On the hardness of the Learning with Errors problem with a discrete reproducible error distribution," arXiv:1605.02051v2, 2016, Available: https://arxiv.org/pdf/1605.02051v2.pdf (18 pages).

* cited by examiner

METHOD AND SYSTEM FOR PRIVACY-PRESERVING SOCIAL MEDIA ADVERTISING

CLAIM OF PRIORITY

This application claims the benefit of U.S. Provisional Application No. 62/529,232, which is entitled "Architecture for Privacy-Preserving Social Media Advertising," and was filed on Jul. 6, 2017, the entire contents of which are hereby expressly incorporated herein by reference.

CROSS REFERENCE

This application cross-references copending U.S. application Ser. No. 15/979,761, which is entitled "Post-Quantum Secure Private Stream Aggregation," and was filed on May 15, 2018, the entire contents of which are hereby expressly incorporated herein by reference.

FIELD

This disclosure relates generally to the fields of information security, and, more particularly, to systems and methods that generate aggregate data collected from multiple client computing devices while preserving the privacy of the client computing devices and enabling verification of the accuracy of the aggregate data.

BACKGROUND

Unless otherwise indicated herein, the materials described in this section are not prior art to the claims in this disclosure and are not admitted to the prior art by inclusion in this section.

Social media marketing has emerged as a new tool for brands to reach certain target groups of consumers for electronic commerce (e-commerce) sales. In particular, many merchants who sell products now form relationships with "influencers" who are individuals that have a large following of potential customers in one or more social media networks. The influencer uses a computing device to advertise his or her use of a product through social media in exchange for a monetary compensation based on the number of social media followers who the influencer encourages to purchase the product. While the use of social media platforms to advertise goods in this manner has produced multi-billion dollar markets, the underlying technology behind these systems collects a large amount of private data from consumers, which can have negative repercussions on the influencer and the brand when too much personal information is collected. Additionally, the underlying technology of modern e-commerce systems makes it difficult to for a merchant to prove what sales were actually made due to the social media following of the influencer, and this may prevent the influencer from receiving accurate compensation.

To illustrate these problems, FIG. 8 depicts a prior-art electronic commerce system 800 that includes the client computing systems 804A-804N of one or more social media network users U, the server system (or multiple systems) 820 of a seller S, and the computer system 830 of an influencer I. In this example, the influencer I is an athlete who uses social media platforms to advertise a brand of shoe to the users U, although the same system is applicable to any form of product and the influencer can be any individual with a large social media following. The influencer I receives payment based on what is effectively a commission model for encouraging the users U to purchase the shoe from the seller S. In many practical systems, the total number of user computing systems 804A-804N that follow the influencer is large (e.g. greater than 10,000) and a subset of the users place orders for the shoe from the seller server system 820. In addition to collecting payment information to purchase the shoe, in many instances the seller system 820 collects additional customer information. FIG. 8 depicts the age and the gender of each customer as examples of two pieces of information that are collected from each of the client computing systems 804A-804N of the corresponding users.

In the prior-art system 800, the users U must trust both the server system 820 and the influencer computer system 830 to collect a large amount of personal information and to not misuse the personal information or to inadvertently leak the data to malicious third parties. The influencer I must trust the seller 820 to provide accurate information about the sales of products that were made based on the advertising of the influencer I. This trust includes not only the payments that are made to the influencer I, but the influencer I also has an interest in understanding the demographic information of the customers to improve the influencer's social media following and potentially prove the influencer's popularity to third parties. The influencer I only needs general statistics about the purchasers, such as average statistics over a large population of purchasers that does not compromise the privacy of an individual user, but often the influencer I does not trust the seller S to produce these statistics accurately since the seller S could, for example, not accurately report all of the sales that were made to the users U to the influencer I. To reduce the perception that the seller S is not accurately reporting information to the influencer I in prior-art e-commerce systems, the seller system 820 often sends the influencer system 830 a full record of each sale, with a few elements such as credit card data being removed from the record. This process divulges a large amount of personal data about each user U and is still not completely reliable since the seller S could still omit some records to avoid paying the influencer I all of the commission fees that are due. Finally, the seller S must trust that the influencer I will not intentionally misuse the personal data of the users U or inadvertently leak the personal data to malicious third parties since such a breach will have a negative impact on the seller.

As described above, in the prior-art system 800 the users U must not only trust the seller S, but must, often unknowingly, trust the influencer I. Furthermore, the influencer I and the seller S must trust each other. While the word "trust" has a positive connotation in normal usage, in the realm of information security the term "trust" means that a computing device must be trusted to ensure secure operation of the system. Thus, in the prior-art system 800 the users U are required to trust that both the seller system 820 and the influencer system 830 will properly handle any personal information that is submitted to both the seller S and the influencer I. Furthermore, the influencer I must trust that the seller S honestly provides a full accounting of product purchases that are attributable to the influencer I and the seller S must trust that I will safeguard the privacy of personally identifiable information about the users U. Given these drawbacks, technological improvements to e-commerce systems that improve the privacy of user data and the ability to verify the accuracy of aggregate statistical data would be beneficial.

SUMMARY

In one embodiment, a method for operating an aggregator in an electronic commerce system has been developed. The method includes receiving, with a network interface in the aggregator, a plurality of ciphertexts and a plurality of signatures transmitted from a plurality of clients, each ciphertext in the plurality of ciphertexts including encrypted data, corresponding to noisy plaintext data of a category of information for a user that purchased a product, and each signature in the plurality of signatures corresponding to a ciphertext in the plurality of ciphertexts, generating, with a processor in the aggregator, a first sum of the plurality of ciphertexts, generating, with a processor in the aggregator, a first sum of the plurality of signatures, verifying, with the processor in the aggregator, the first sum of the plurality of ciphertexts with a homomorphic signature system based on the first sum of the plurality of signatures and homomorphic verification data stored in a memory of the aggregator, decrypting, with the processor in the aggregator, the first sum of the plurality of ciphertexts in a private stream aggregation (PSA) process based on homomorphic decryption data stored in the memory of the aggregator to generate a first sum of noisy plaintext data in response to a success of the verification, and identifying, with the processor in the aggregator, aggregate statistical information transmitted from the plurality of clients based on the first sum of noisy plaintext data while preserving differential privacy of the plurality of clients.

In a further embodiment, the method includes rejecting, with the processor in the aggregator, the first sum of the plurality of ciphertexts in response to a failure of verification of the first sum of the plurality of ciphertexts indicating that at least one ciphertext in the first plurality of ciphertexts or at least one signature in the first plurality of signatures is invalid.

In a further embodiment, the homomorphic verification data are stored in the memory further include a plurality of public keys corresponding to the plurality of clients.

In a further embodiment, the method includes receiving, with the network interface in the aggregator, a second sum of noisy plaintext data corresponding to a plurality of noisy plaintext data transmitted from the plurality of clients, a second sum of a plurality of ciphertexts, and a second sum of a plurality of signatures from another aggregator of a seller, verifying, with the processor in the aggregator, the second sum of the plurality of ciphertexts with the homomorphic signature system based on the second sum of the plurality of signatures and the homomorphic verification data stored in the memory of the aggregator, decrypting, with the processor in the aggregator, the second sum of the plurality of ciphertexts in the PSA process based on the homomorphic decryption data stored in the memory of the aggregator to generate a third sum of noisy plaintext data in response to a success of verification of the second sum of the plurality of ciphertexts, and verifying the second sum of noisy plaintext data from the aggregator of the seller by only in response to the second sum of noisy plaintext data matching the third sum of noisy plaintext data.

In a further embodiment, the method includes rejecting, with the processor in the aggregator, the second sum of the plurality of ciphertexts in response to a failure of verification of the second sum of the plurality of ciphertexts indicating that at least one ciphertext in the second plurality of ciphertexts or at least one signature in the second plurality of signatures is invalid, and rejecting, with the processor in the aggregator, the second sum of noisy plaintext data in response to the second sum of noisy plaintext data not matching the third sum of noisy plaintext data.

In a further embodiment, the PSA process is a post-quantum private stream aggregation (PQ-PSA) process.

In a further embodiment, the plurality of clients does not trust the aggregator and the aggregator is incapable of decrypting any individual ciphertext in the plurality of ciphertexts.

In another embodiment, an aggregator in an electronic commerce system has been developed. The aggregator includes a network interface configured to receive data via a data network, a memory, and a processor operatively connected to the network interface and the memory. The processor is configured to receive a plurality of ciphertexts and a plurality of signatures transmitted from a plurality of clients with the network interface, each ciphertext in the plurality of ciphertexts including encrypted data corresponding to noisy plaintext data of a category of information for a user that purchased a product, and each signature corresponding to a ciphertext in the plurality of ciphertexts, generate a first sum of the plurality of ciphertexts, generate a first sum of the plurality of signatures, verify the first sum of the plurality of ciphertexts with a homomorphic signature system based on the first sum of the plurality of signatures and homomorphic verification data stored in a memory of the aggregator, decrypt the first sum of the plurality of ciphertexts in a private stream aggregation (PSA) process based on homomorphic decryption data stored in the memory of the aggregator to generate a first sum of noisy plaintext data in response to a success of the verification, and identify aggregate statistical information transmitted from the plurality of clients based on the first sum of noisy plaintext data while preserving differential privacy of the plurality of clients.

In a further embodiment, the processor is further configured to reject the first sum of the plurality of ciphertexts in response to a failure of verification of the first sum of the plurality of ciphertexts indicating that at least one ciphertext in the first plurality of ciphertexts or at least one signature in the first plurality of signatures is invalid.

In a further embodiment, the homomorphic verification data stored in the memory further include a plurality of public keys corresponding to the plurality of clients.

In a further embodiment, the processor is further configured to receive a second sum of noisy plaintext data corresponding to a plurality of noisy plaintext data transmitted from the plurality of clients, a second sum of a plurality of ciphertexts, and a second sum of a plurality of signatures from another aggregator of a seller with the network interface, verify the second sum of the plurality of ciphertexts with the homomorphic signature system based on the second sum of the plurality of signatures and the homomorphic verification data stored in the memory of the aggregator, decrypt the second sum of the plurality of ciphertexts in the PSA process based on the homomorphic decryption data stored in the memory of the aggregator to generate a third sum of noisy plaintext data in response to a success of verification of the second sum of the plurality of ciphertexts, and verify the second sum of noisy plaintext data from the aggregator of the seller by only in response to the second sum of noisy plaintext data matching the third sum of noisy plaintext data.

In a further embodiment, the processor is further configured to reject the second sum of the plurality of ciphertexts in response to a failure of verification of the second sum of the plurality of ciphertexts indicating that at least one ciphertext in the second plurality of ciphertexts or at least one signature in the second plurality of signatures is invalid, and reject the second sum of noisy plaintext data in response to the second sum of noisy plaintext data not matching the third sum of noisy plaintext data.

In a further embodiment, the PSA process is a post-quantum private stream aggregation (PQ-PSA) process.

In a further embodiment, the plurality of clients does not trust the aggregator and the aggregator is incapable of decrypting any individual ciphertext in the plurality of ciphertexts.

In another embodiment, a method for operating an aggregator in an electronic commerce system has been developed. The method includes receiving, with a network interface in the aggregator, a plurality of ciphertexts transmitted from a plurality of clients, each ciphertext encrypting noisy plaintext data of a category of information for a user that purchased a product, generating, with a processor in the aggregator, a sum of the plurality of ciphertexts, decrypting, with the processor in the aggregator, the sum of the plurality of ciphertexts in a private stream aggregation (PSA) process based on homomorphic decryption data stored in a memory of the aggregator to generate a first sum of noisy plaintext data, and identifying, with the processor in the aggregator, aggregate statistical information transmitted from the plurality of clients based on the first sum of noisy plaintext data while preserving differential privacy of the plurality of clients.

In a further embodiment, the method includes receiving, with the network interface in the aggregator, a plurality of signatures transmitted from the plurality of clients, each signature corresponding to noisy plaintext data that are encrypted in each ciphertext in the plurality of ciphertexts, generating, with the processor in the aggregator, a first sum of the plurality of signatures, and verifying, with the processor in the aggregator, the first sum of noisy plaintext data with a homomorphic signature system based on the first sum of the plurality of signatures and homomorphic verification data stored in the memory of the aggregator.

In a further embodiment, the method includes rejecting, with the processor in the aggregator, the first sum of noisy plaintext data in response to a failure of verification of the first sum of noisy plaintext data indicating that at least one ciphertext in the plurality of ciphertexts or at least one signature in the plurality of signatures is invalid.

In a further embodiment, the homomorphic verification data stored in the memory further include a plurality of public keys corresponding to the plurality of clients.

In a further embodiment, the method includes receiving, with the network interface in the aggregator, a second sum of noisy plaintext data from another aggregator of a seller, receiving, with the network interface in the aggregator, a second sum of signatures corresponding to the second sum of noisy plaintext data from the other aggregator of the seller, and verifying, with the processor in the aggregator, the second sum of noisy plaintext data with the homomorphic signature system based on the second sum of the plurality of signatures and the homomorphic verification data stored in the memory of the aggregator.

In a further embodiment, the PSA process is a post-quantum private stream aggregation (PQ-PSA) process.

DETAILED DESCRIPTION

Figure 1:
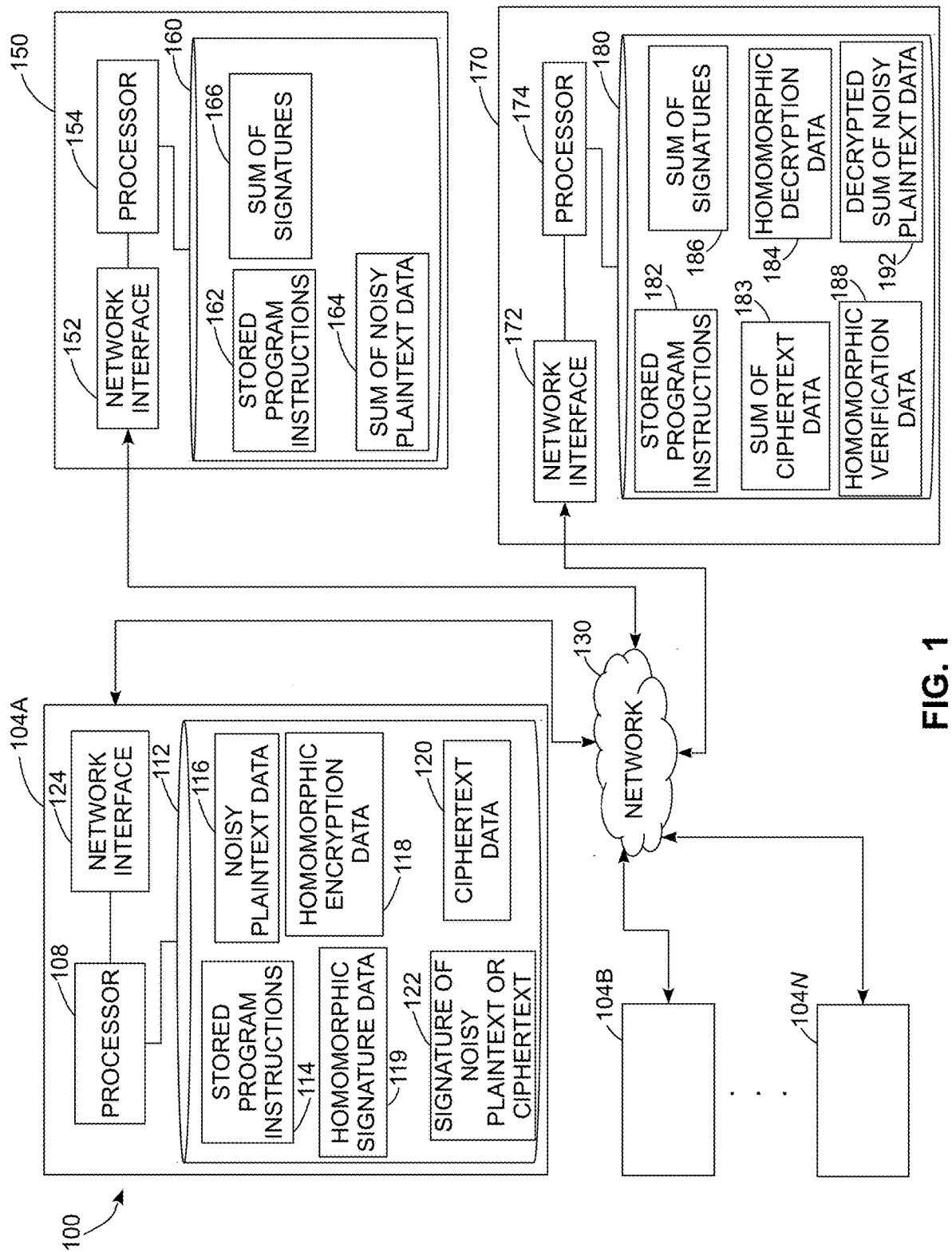
FIG. 1 is a schematic diagram of an electronic commerce system that preserves the differential privacy of user data and enables verification of aggregate statistical information about users.

For the purposes of promoting an understanding of the principles of the embodiments described herein, reference is now made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the terms "homomorphism" and "homomorphic" refer to a property of some cryptographic systems that enables a computerize system to perform operations using encrypted ciphertext data that produces a plaintext result, after decryption, that matches the results of the same operations if applied to the plaintext data. For example, cryptographic systems that provide additive homomorphism are described herein that enable a computer to add two ciphertexts a and b together to produce a third ciphertext c. The third ciphertext c, when decrypted, produces a plaintext value that matches the sums of the plaintext data that are encrypted in a and b. For example, if a and b are a ciphertexts that encrypt the values 2 and 3, respectively, then the ciphertext c, when decrypted, produces the value 5 (2+3=5). A computer that receives the original ciphertexts a and b can produce the ciphertext c via direct addition of the original ciphertexts without ever decrypting either of the original encrypted inputs a and b, or requiring access to any cryptographic key. Some, but not all, cryptographic systems provide homomorphic properties, and the embodiments described herein employ cryptographic systems that provide additive homomorphism as described above and optionally other homomorphic properties.

As used herein, the term "private stream aggregation" (PSA) refers to a cryptographic communication system in which multiple clients encrypt noisy plaintext data of a numeric value to produce encrypted ciphertext data using an encryption system that provides the additive homomorphism property described above. The clients transmit the ciphertext data to another computing system, which is referred to as an "untrusted aggregator", that is incapable of decrypting any of the individual ciphertexts that are received from the individual clients. Instead, the untrusted aggregator adds the ciphertext data from multiple clients together while the data remain encrypted to produce an aggregate sum of the individual ciphertexts. In some configurations the untrusted aggregator uses a decryption process that enables the untrusted aggregator to decrypt the sum of all the individual noisy plaintext data even though the untrusted aggregator cannot decrypt the individual ciphertext from each client, which preserves the differential privacy of the individual clients. In other configurations, the untrusted aggregator transmits the sum of the ciphertext data to another untrusted computing system that performs the decryption of the aggregate data but, once again, the other computing system cannot determine the contents of the plaintext data from an individual client.

PSA processes provide differential privacy where the term "differential privacy" refers to a property of the PSA process that prevents any party from determining the individual contribution of one client to the aggregate sum of all the data. For example, in a PSA process in which each client encodes a numeric value corresponding to the age of a customer, each client computing device for each customer adds a random noise value, such as a Laplace noise value, to the actual age and encrypts the noisy age value using homomorphic encryption. The untrusted aggregator receives multiple ciphertext messages with different ages from multiple clients, generates a sum of all the ciphertext messages, and is only capable of decrypting the sum of all the ages. The inability of the untrusted aggregator or other untrusted computing system to decrypt individual ages or other individual ciphertexts even if the untrusted system can decrypt the sum of all the ciphertexts is referred to as an "obliviousness" property. Given the number of clients that transmitted messages, the untrusted aggregator can determine an average age of all of the clients, but is oblivious to the age of a single client given the ciphertext data received from the client and the decrypted aggregate plaintext sum of all the ages that were transmitted from all of the clients.

A post-quantum PSA (PQ-PSA) process is one type of PSA process that provides improved computational efficiency for transmitting larger numeric values and that is believed to be secure against eavesdropping attackers that have access to quantum computers that are more advanced than what is generally known to the art. In the PQ-PSA process, each client encrypts noisy plaintext data to generate ciphertext data using a first public key in a cryptographic system that provides additive homomorphism, such as a learning with errors (LWE) asymmetric cryptographic system, which has a corresponding private key that is known to the untrusted aggregator. Each client then embeds this first ciphertext in a vector that is indistinguishable from a discrete Gaussian vector. This is achieved by constructing a distribution that is indistinguishable from a discrete Gaussian distribution and sampling said vector from this distribution. This vector is called the error vector $E_i$. Because $E_i$ is capable of embedding large numeric values, each client can encrypt a comparatively large numeric value (e.g. 8, 16, 32, 64, or 128 bits of data) in a single ciphertext. Each client then performs the following matrix multiplication and addition operation to produce an output vector b: $b=[A][s_i]+E_i$ where A is a multi-dimensional matrix of random data that forms part of an LWE public key and is known to each client and the untrusted aggregator, $s_i$ is a one-dimensional vector of random secret data that each client i possesses individually and does not reveal to the untrusted aggregator, and $E_i$ is the previously generated error vector that is different for each client. The final output b is a vector that is normally part of an LWE public key, but in the PQ-PSA process each vector b is actually a ciphertext $c_i$ from client i that encodes the noisy plaintext data from the client in a manner that prevents the untrusted aggregator or any third party from decrypting individual ciphertext messages.

In the PQ-PSA process, the untrusted aggregator receives the ciphertext vectors $c_i$ that are transmitted from multiple clients and adds them together to produce an aggregate encrypted value $c_{agg}$ ($c_{agg}=\Sigma c_i$). The untrusted aggregator, or another untrusted computing system such as a computing system of a third party, uses the predetermined matrix A and negative sum of all the secret keys $\Sigma s_i$ from all of the clients to recover a sum $\Sigma E_i$ of all the error vectors that each client generated ($\Sigma E_i = c_{agg}+[A][\Sigma s_i]$). The negative sum of all the secret keys $\Sigma s_i$ does not reveal the individual secret key $s_i$ of any individual client to the untrusted aggregator, and the untrusted aggregator is never able to decrypt individual ciphertexts $c_i$. The untrusted aggregator or other untrusted decryption system then uses a predetermined gadget matrix to convert the Gaussian random data back to a uniformly random aggregate ciphertext and the untrusted aggregator or other decryption system uses the private key that corresponds to the original public key used for encryption by each client to decrypt the sum of all the noisy plaintext data. The additive homomorphism of LWE encryption systems enable the untrusted decryption system to recover the sum of all the noisy plaintext data from the clients while preserving differential privacy for each client. Additional details of a PQ-PSA process are described in copending U.S. application Ser. No. 15/979,761. The embodiments described herein can use both standard PSA and PQ-PSA process.

In the embodiments described herein, the PSA processes provide differential privacy to the clients. However, PSA by itself does not necessarily prevent an untrusted system from altering aggregate plaintext data or ciphertext data to produce inaccurate results after the clients have transmitted the data. The process of altering or "forging" data could be used by an aggregator to provide inaccurate information even if the aggregator cannot breach the differential privacy of client data. In the embodiments described herein, a homomorphic signature system enables each client of a user to produce a cryptographic signature of data in a message that corresponds to noisy plaintext data or ciphertext data. A homomorphic signature system enables the sum of an additive combination of multiple signatures from multiple messages to be used to verify the authenticity of a corresponding sum of an additive combination of multiple sets of input data from the clients. Each client is a signer that generates the signature $\sigma_1$ for a single input message $m_i$, and another computing system that is referred to as a "verifier" combines the sums of the messages and the sums of the signatures to verify the authenticity of a sum of multiple messages. The homomorphic signature system provides an "unforgeability" property that prevents the untrusted aggregator from altering or omitting data that are received from the clients in a manner that would escape detection by a verifier. The embodiments described herein use both PSA and a homomorphic signature system.

In one example of a homomorphic signature system that is known to the art, a lattice-based homomorphic signature system employs a private, signing key $sk_i$ for each client i that signs an input message $m_i$. using a signature function Auth to generate a cryptographic signature $\sigma_i$: $\sigma_i$=Auth($sk_i$, $m_i$, id), where $m_i$ is the an input message, such as noisy plaintext data, for a client i. The id term is a nonce identifier that is shared by each of the clients and any computing device that performs verification to prevent a forgery attempt that seeks to use previously recorded valid message and signature from a client to alter the output of a later set of communications that include a message from the client. Thus, the id term ensures that each signature is unique to one set of messages from a plurality of clients. Each cryptographic signature is also referred to as a tag that a client generates for a piece of noisy plaintext data or ciphertext data. In one embodiment, the Auth function applies a latticed-based homomorphic hash function to the input message $m_i$ and the private key $sk_i$ signs the hash value output of the lattice-based homomorphic hash function to produce the signature $\sigma_i$ that has additive homomorphism. That is to say, a verifier that receives a sum of multiple signatures will successfully verify a corresponding sum of multiple messages that each corresponds to one of the multiple signatures. The homomorphic signature system provides a combination function that enables a verifier to combine multiple signatures for multiple messages together: Combine($\{(m_i, \sigma_i)\}_{i=i}^{l}$) where l indicates the total number of input messages $m_i$ and signatures $\sigma_i$. The combine function produces two sums based on the message and signature inputs, which produces an aggregate sum of all the input messages $m_{agg}$ and another aggregate sum of the signatures $\sigma_{agg}$. The verifier has access to a combination $\vec{vk}$ of all individual public, verification keys $vk_i$ that correspond to the private keys $sk_i$ in the clients, and access to the public keys does not enable the verifier or other third parties to forge signatures. The verifier determines if the combination of messages $m_{agg}$ matches the aggregate signature $\sigma_{agg}$ using a verification function: $\text{Vrf}(\vec{vk}\Sigma_{i=1}^{l}m_i,\sigma_{agg},id) \rightarrow \text{Vrf}(\vec{vk},m_{agg},\sigma_{agg},id) \rightarrow$ [accept|reject]. The verification function also applies the lattice-based homomorphic hash function to $m_{agg}$, which enables the verifier to reproduce a hash value that matches the sum of the hash values from the individual input messages $m_i$. The verification function generates "accept" and "reject" outputs that represent any set of outputs from the verifier (e.g. a numeric 0 or 1 output) that indicates if the aggregate signatures match the aggregate input message data (accept) or not (reject). Additional details of one embodiment of a homomorphic signature system are described in a publication by Zhengjun Jing entitled "An Efficient Homomorphic Aggregate Signature Scheme Based on Lattice," Mathematical Problems in Engineering Volume 2014, Article ID 536527, that was published on Nov. 6, 2014.

FIG. 1 depicts a system 100 that implements private stream aggregation (PSA) and a homomorphic signature system to improve the privacy of clients that buy a product from a seller based on advertisements from an influencer and to ensure that the influencer can verify the accuracy of aggregate information about the clients that is received from the seller. The system 100 includes a plurality of clients 104A-104N, a first aggregator 150 that is operated by the seller, and a second aggregator 170 that is operated by the influencer. In the system 100 the aggregator 150 is referred to as a "trusted" aggregator from the perspective of the clients since the clients 104A-104N must rely on the correct operation of the aggregator 150 to preserve the privacy of client data. However, from the perspective of the influencer the aggregator 150 is "untrusted" because, as described below, the second aggregator 170 independently collects and verifies the accuracy of aggregate customer data that the aggregator 150 provides to the influencer. The aggregator 170 is trusted by only the influencer and is otherwise referred to as an "untrusted" aggregator 170 since neither the clients 104A-104N nor the aggregator 150 of the seller rely on the correct operation of the untrusted aggregator 170 for either of differential privacy of user data or verification of the accuracy of user data. Each of the clients 104A-104N is trusted by one of the users U and all of the clients 104A-104N and their corresponding users U trust the aggregator 150. However, the clients 104A-104N do not trust each other or the untrusted aggregator 170. The aggregator 170 of the influencer does not trust the aggregator 150 of the seller, but trusts the individual clients 104A-104N to provide accurate information. As described herein, the system 100 ensures both the differential privacy of data transmitted from the clients 104A-104N from the perspective of the untrusted aggregator 170 of the influencer. The system 100 also ensures the unforgeability of data that the aggregator 150 of the seller transmits to the aggregator 170 of the influencer. The clients 104A-104N, aggregator 150, and the untrusted aggregator 170 are communicatively connected to each other via a data network 130, which is typically the Internet.

In FIG. 1, each of the clients 104A-104N is a computing device that is operated by a user U to, amongst other functions, interact with an influencer I via one or more social networking services and purchase a product that the influencer advertises from a seller S, such as by selecting a link to purchase the product that is included in a social media post made by the influencer I. Examples of client hardware implementations include personal computers (PCs) and mobile electronic devices such as smartphones, wearable computing devices, in-vehicle information systems, and the like. FIG. 1 depicts the client 104A in greater detail, and the other clients 104B-104N include a similar configuration to the client 104A. The client 104A includes a processor 108, network interface 124, and a memory 112. The processor 108 is a digital logic device that includes one or more of a microprocessor, microcontroller, digital signal processor (DSP), field programmable gate array (FPGA), application specific integrated circuit (ASIC), and any other suitable digital logic devices. The processor 108 optionally includes a hardware random number generator that can generate random data that is considered to be cryptographically secure. In some embodiments the processor 108 is implemented using multiple discrete devices while in other embodiments the processor 108 is implemented as a System on a Chip (SoC) device. The processor 108 is operatively connected to the memory 112 and the network interface 124.

In the client 104A, the memory 112 is a digital data storage device that typically includes a volatile memory such as static or dynamic random access memory (RAM) and a non-volatile data storage device such as a magnetic disk or solid state data storage device. The memory 112 stores programmed instructions 114 for execution by the processor 108, the plaintext data including statistical noise 116, homomorphic encryption data 118, homomorphic signature data 119, the ciphertext data 120 that includes a ciphertext for at least one category of noisy plaintext 116, and signature data 122 for a signature that is generated for either the noisy plaintext data 116 or the ciphertext data 120.

The clients 104A-104N possess sensitive plaintext data and the PSA provides a means to publish the data to the untrusted aggregator 170 while preserving differential privacy of the individual clients. To serve as a non-limiting practical example, in this disclosure each of the clients 104A-104N transmits noisy encrypted data corresponding to numeric values of the age and the gender of the user of each client. The age is represented as an integer (e.g. 20 years old) and the gender is represented as one of two numeric values (e.g. [female=1, male=0], or two other values). The processor 108 generates Laplace noise that is added to the original plaintext data to produce the noisy plaintext data 116. The noise added to the original plaintext data helps to preserve the differential privacy of each client. The processor 108 in the client 104A uses the homomorphic encryption data 118, such as the first LWE public key, public key matrix A, and individual secret data s in the PQ-PSA process or any other suitable encryption keys for a different PSA embodiment, to encrypt the noisy plaintext. The client 104A arranges each category of data (age and gender) into a single vector for a single encryption operation or encrypts each category of data separately to generate the ciphertext data 120. The processor 108 also uses the homomorphic signature data, which includes a private signing key that is unique to each of the clients 104A-104N, to generate signature data 122 of the noisy plaintext data 116 or the ciphertext 120. The signature data 122 enables the untrusted aggregator 170 or another third party computing device to verify that the sum of all messages from the clients 104A-104N that is provided by the trusted aggregator 150 or any other system is an authentic and accurate sum of the data (e.g. sum of ages and of numeric gender values) that the clients 104A-104N transmit in the system 100.

In the client 104A, the network device 124 uses a wired or wireless network transceiver that enables the client 104A to transmit data through the network 130 to the trusted aggregator 150 of the seller and the untrusted aggregator 170 of the influencer. In the system 100, the network 130 is a local area network (LAN) a wide area network (WAN) or a combination of LAN and WAN networks that provides a communication channel between the clients 104A-104N and both the trusted aggregator 150 and the untrusted aggregator 170. Examples of wired network transceivers include, but are not limited to, Ethernet network interface devices and examples of wireless transceivers include wireless LAN (WLAN) devices, such as a wireless network interface using Bluetooth or the 802.11 family of protocols, and wireless WAN (WWAN) devices, such as an LTE or "4G", "5G", or similar wireless network interface devices.

In the system 100 of FIG. 1, the trusted aggregator 150 (referred to interchangeably as the "aggregator 150") is a server computing device. The trusted aggregator 150 is operated by a seller that sells the product being advertised by the influencer to the users who operate the clients 104A-104N. The trusted aggregator 150 includes a processor 154, a network interface 152, and a memory 160. The processor 154 is operatively connected to the network interface 152 and the memory 160. The hardware embodiments of the processor 154, memory 160, and the network interface 152 in the aggregator 150 are similar in structure to the processor 108, memory 112, and network interface 124, respectively, in the client 104A. However, in some embodiments the aggregator 150 includes a processor 154 with higher processing power than the processor 108 and the memory 160 may have a larger capacity than the memory device 112 since the aggregator 150 may be implemented as, for example, a commercial server with substantially greater computing power than the client devices 104A-104N. As described above, the aggregator 150 is a trusted computing device from the perspective of the clients 104A-104N because the clients transmit sensitive information to the aggregator 150 and potentially to other computer systems operated by the seller as part of the transaction process for purchasing a product. In that operation, the clients 104A-104N need to transmit personally identifiable information to successfully complete the product ordering transaction. However, the aggregator 150 still cannot successfully forge data pertaining to the aggregate sums of different categories of client data (e.g. age and gender) that are stored in the memory of 160 of the aggregator 150 in a manner that could escape detection by the untrusted aggregator 170. Thus, the clients 104A-104N must trust the aggregator 150 but the untrusted aggregator 170 of the influencer does need to trust the aggregator 150.

In the trusted aggregator 150, the memory 160 stores program instructions 162 that the processor 154 executes to generate a sum of the noisy plaintexts 164 and a sum of the signatures 166 that correspond to each of the noisy plaintexts. While not shown in greater detail, the seller also uses the aggregator 150 or another computing system to receive additional data from each client to execute a purchase transaction, such as name, address, and credit card data that are not shared with the untrusted aggregator 170. The aggregator 150 in FIG. 1 receives additional demographic information from the users of the clients 104A-104N, such as the age and gender information, in the form of the noisy plaintext data. During operation, the aggregator 150 generates sums of the noisy plaintext in one or more information categories to provide an aggregate summary that preserves the differential privacy of the individual clients 104A-104N when transmitted to the untrusted aggregator 170 or to a third party. While not shown in greater detail in FIG. 1, the clients 104A-104N can additionally transmit the original plaintext data without noise to the aggregator 150, although the aggregator 150 does not reveal the original plaintext data or a sum of the original plaintext data to the untrusted aggregator 170 or other third parties. Additionally, the homomorphic signature system prevents the aggregator 150 from forging noisy plaintext data or the corresponding signatures to maintain the unforgeability property.

In the system 100 of FIG. 1, the untrusted aggregator 170 (referred to interchangeably as the "aggregator 170") is another computer system such as a PC, mobile electronic device, server device, or the like that is operated by the influencer. In some embodiments, the untrusted aggregator 170 is a computer system that is implemented as part of a social network service that the influencer uses to promote the product that is sold by the seller. The untrusted aggregator 170 includes a network interface 172, a processor 174, and a memory 180. The processor 174 is operatively connected to the network interface 172 and the memory 180. The hardware embodiments of the processor 174, network interface 172, and the memory 180 in the untrusted aggregator 170 are similar in structure to the corresponding elements of the client 104A and the aggregator 150 that are described above.

In the untrusted aggregator 170, the memory 180 stores programmed instructions 182 for execution by the processor 174, a sum of ciphertext data 183 that are received from the clients 104A-104N, a sum of signatures 186 that are received from the clients 104A-104N, homomorphic decryption data 184, homomorphic verification data 188, and the decrypted sum of noisy plaintext data 192. The homomorphic decryption data 184 includes, for example, the first LWE private key that corresponds to the first LWE public key used by each of the clients 104A-104N, the public key matrix A, and a sum $s_{agg} = \Sigma s_i$ of all the of the individual secrets $s_i$ that are stored in the homomorphic encryption data 118 of the clients 104A-104N in the PQ- PSA process or any other suitable encryption keys for a different PSA embodiment. During operation, the influencer system 170 uses the homomorphic decryption data 184 in the PSA process to decrypt the sum $c_{agg}$ of the ciphertext data 183 and generate the decrypted sum of noisy plaintext data 192 while preserving differential privacy of the clients 104A-104N.

The homomorphic verification data 188 includes, for example, a plurality of public keys $vk_i$, one for each of the clients 104A-104N that correspond to the individual private signing keys $sk_i$ in the homomorphic signature data 119 of the clients 104A-104N, a nonce identifier, and any other data needed for a homomorphic signature system to verify the decrypted sum of noisy plaintext data 192. The untrusted aggregator 170 receives the public keys $vk_i$ from, for example, a trusted repository of public key data or directly using a key exchange protocol with the clients 104A-104N. During operation of the untrusted aggregator 170, if the processor 174 performs a verification process for the decrypted aggregate sum of the noisy plaintext data 192 using the sum of signatures 186 successfully, then the processor 174 can verify if the sum of noisy plaintext data 164 that the trusted aggregator 150 of the seller transmits to the untrusted aggregator 170 of the influencer is correct or incorrect. As described in further detail below, the untrusted aggregator 170 can share the decrypted aggregate noisy plaintext data 192 with third party merchants to enable the third-party verification of the authenticity of the decrypted sum of the noisy plaintext data 192 and the corresponding sum of noisy plaintext data 164 from the aggregator 150.

Figure 2:
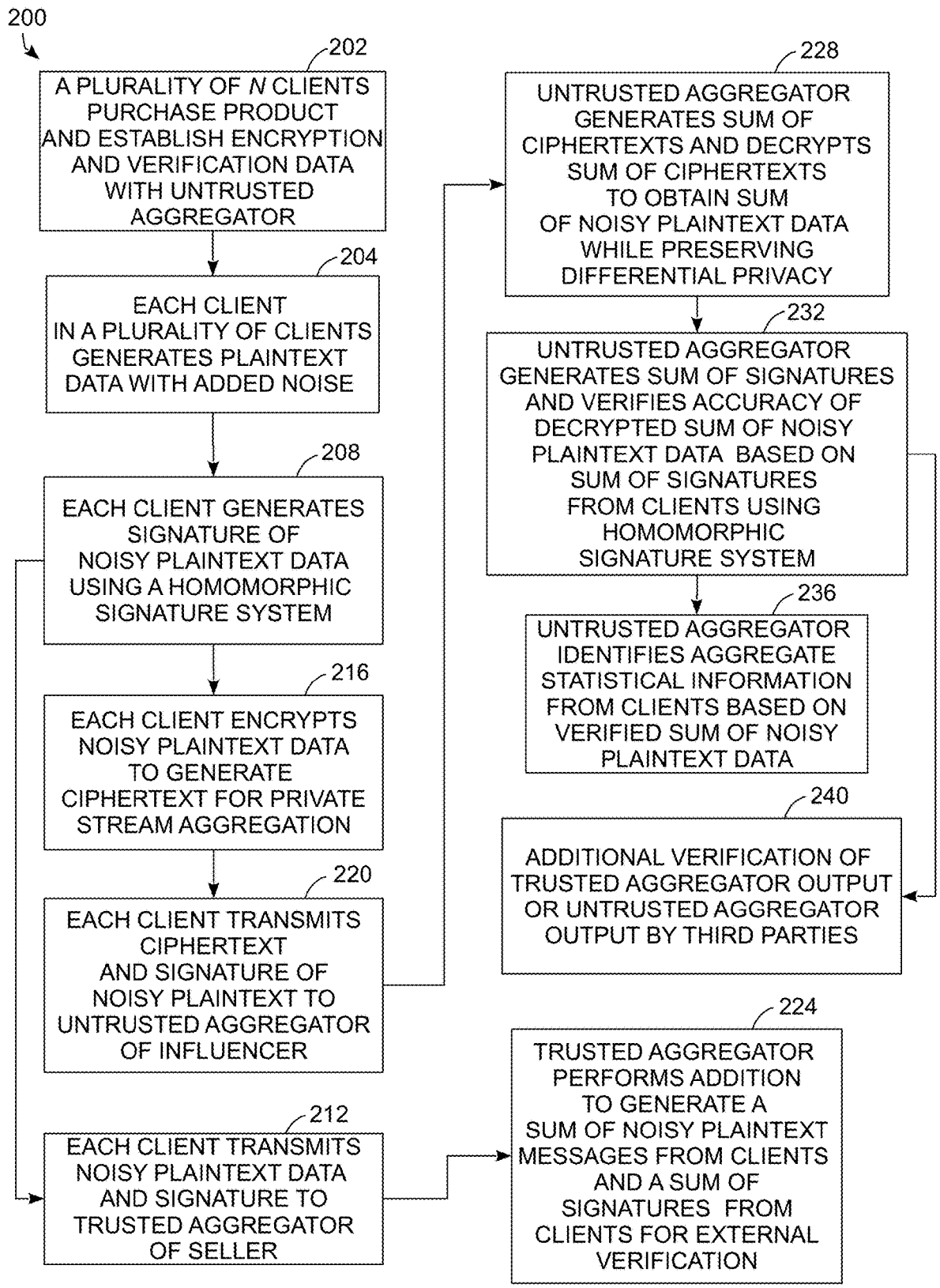
FIG. 2 is a block diagram of a process for operation of an e-commerce system that uses private stream aggregation and a homomorphic signature system to preserve the differential privacy of users who purchase products while enabling an aggregator of an influencer to verify the accuracy of aggregate statistical information about users.

FIG. 2 depicts a block diagram of a process 200 for operation of an e-commerce system that uses PSA and a homomorphic signature system to preserve the differential privacy of users who purchase products while enabling an influencer to verify the accuracy of data provided by the seller. The process 200 is described in conjunction with the system 100 of FIG. 1 and additional diagrams in FIG. 3 and FIG. 4 for illustrative purposes.

During the process 200, the users of each of the clients 104A-104N purchases a product from the seller based on an endorsement by the influencer. The clients 104A-104N are not otherwise associated with each other prior to purchasing the product although the clients 104A-104N act as a group to encrypt data in a PSA process and to generate signatures in a homomorphic signature system. The process 200 begins as a plurality of N clients 104A-104N (e.g. N=1000 although larger or smaller groups can be used) purchases the product from the seller and establish encryption and signature verification data with the untrusted aggregator 170 (block 202). In the system 100, each of the clients 104A-104N transmits a message indicating that the client made a purchase to the untrusted aggregator 170. The clients do not include any personal information in the message, however. Instead, each client only includes a communication address such as an internet protocol (IP) address, a uniform resource locator (URL) that can be resolved using the domain name system (DNS), or any other suitable address that enables communication between of the clients 104A-104N amongst themselves and with the untrusted aggregator 170. When N clients have sent this information to the untrusted aggregator 170, the untrusted aggregator 170 transmits any information that is required to enable the PSA communication process (e.g. a one-time-use randomly generated matrix A in the PQ-PSA embodiment), any information that is required to implement the homomorphic signature system (e.g. a nonce identifier that links the signatures from all of the clients 104A-104N together for a single round of communication), and the address information of all of the clients to each of the clients 104A-104N. The clients 104A-104N then perform a multi-party computation (MPC) process that enables each client to generate a one-time-use secret $s_i$ in the homomorphic encryption data. 118 ($s_i$ is generated independently for each client) and for all of the clients 104A-104N to generate a sum of all the secrets $\Sigma s_i$ that the untrusted aggregator 170 receives and stores in the homomorphic decryption data 184. In another embodiment, a trusted third party computing device (not shown in FIG. 1) generates and transmits the individual secrets $s_i$ to each of the clients 104A-104N in a secure manner that cannot be observed by other third parties, including the aggregators 150 and 170. The trusted third party computing device transmits the sum of the secrets $\Sigma s_i$ to the untrusted aggregator 170. The trusted third party computing device is not under the control of the trusted aggregator 150 or any other computer of the seller, the untrusted aggregator 170 or any other computer of the influencer, or any of the individual clients 104A 104N or any other computers of the users. In either embodiment, the untrusted aggregator 170 can only use the sum of secrets $\Sigma s_i$ to decrypt an aggregate sum of all the ciphertexts from all of the clients 104A-104N, and this process does not reveal the individual secret data $s_i$ of any individual client to the untrusted aggregator 170 or to any of the other clients. For generating signatures in the homomorphic signature system, each of the clients 104A-104N stores the nonce identifier as part of the homomorphic signature data 119 to use in the signature process and the untrusted aggregator 170 stores the nonce identifier in the homomorphic verification data 188 to use in verification. The nonce identifier is not secret and is also provided to third-parties as part of a verification process. If the number of clients that purchases the product exceeds the predetermined number N, then the system 100 performs the process 200 multiple times for different groups of clients that purchase the product based on the endorsement of the influencer. The system 100 uses different encryption/decryption data for the PQ-PSA communication and a different nonce identifier for the homomorphic signature system each time the process 200 is performed.

The process 200 continues as each of the clients 104A-104N generates plaintext data with added noise data for transmission to the trusted aggregator 150 (block 204). Using client 104A as an example, the processor 108 executes the stored program instructions 114 to generate the plaintext data including, for example, a numeric value of the age and/or gender of the user of the client 104A. The processor 108 also executes the stored program instructions 114 to generate random noise data that are added to the plaintext data to generate noisy plaintext data 116. In the embodiment of FIG. 1 the processor 108 executes the stored program instructions to implement a discrete Laplace mechanism to generate a discrete, randomly generated integer (noise data) that the processor 108 adds to the plaintext data. In one embodiment the discrete Laplace mechanism that generates the noise is defined for the function $f: \mathfrak{D}^n \to \mathfrak{R}^k$ as: $\mathcal{M}_{DL}(D, f(\cdot), \in) = f(D) + (Y_1, \ldots, Y_k)$ where $Y_1$ are independently and identically distributed random variables drawn from $DL_\varsigma$ where $\varsigma = \Delta f / \in$. The added noise $\eta_i$ preserves the differential privacy of each of the clients 104A-104N.

The process 200 continues as each of the clients 104A-104N generates a signature of the noisy plaintext data 116 using the homomorphic signature system (block 208). Using the client 104A as an example, the processor 108 executes the stored program instructions 114 to use the homomorphic signature data 119 including the private signing key $k_i$ in a homomorphic signature system to generate a cryptographic signature $\sigma_i$ for each set of noisy plaintext data that are transmitted to the trusted aggregator 150 of the seller or are encrypted and transmitted to the untrusted aggregator 170 of the influencer. In one embodiment, the processor 108 arranges the noisy plaintext values for one or more categories, such as user age and gender, into a single vector that the processor 108 signs using the homomorphic signature system. The single vector includes a sufficient number of bits to place separate sets of data into different bit ranges of a single vector while avoiding overflows when the bits are added together as either plaintext or ciphertext with additive homomorphism to produce aggregate values. In another embodiment, the processor 108 generates a different signature for an individual piece of noisy plaintext that corresponds to one category of information, such as one signature for the noisy plaintext of the age and another signature for the noisy plaintext of the gender of the user of the client 104A.

The process 200 continues as each of the clients 104A-104N transmits a message that includes the noisy plaintext data 116 and the associated signature data 122 to the trusted aggregator 150 (block 212). In the client 104A, the processor 108 uses the network interface 124 to transmit the noisy plaintext data and the signature data 122 through the network 130 to the network interface 152 of the trusted aggregator 150. Each of the clients 104A-104N transmits the noisy plaintext and signature to the aggregator 150. While the trusted aggregator 150 has full access to the noisy plaintext data 116 that are transmitted from each of the clients 104A-104N, the clients 104A-104N and the aggregator use an encrypted communication channel, such as an encrypted channel generated using the Transport Layer Security (TLS) protocol that is known to the art, to prevent eavesdroppers from accessing the noisy plaintext data during transmission through the data network 130. Additionally, the signature data 122 prevents the trusted aggregator 150 or an external attacker from being able to alter the noisy plaintext data 116 in a manner that escapes detection by a verifier, such as the untrusted aggregator 170.

In addition to sending noisy plaintext data and a signature to the trusted aggregator 150, each of the clients 104A-104N sends encrypted ciphertext data and the signature of the noisy plaintext data to the untrusted aggregator 170 using PSA to protect differential privacy of each client and homomorphic signature system to enable the untrusted aggregator 170 to verify the aggregate results that are produced by the trusted aggregator 150. The process 200 continues as each of the clients 104A-104N encrypts the noisy plaintext data to generate ciphertext using the PSA processes described above, including the PQ-PSA embodiment and other PSA embodiments (block 216). Using the client 104A as an example, the processor 108 executes the stored program instructions 114 to implement the PSA encryption. The processor 108 uses the homomorphic encryption data 118 in the PSA process to encrypt the noisy plaintext data 116 and generate the ciphertext 120. As described above, the ciphertext 120 ($c_i$) in each encrypted message cannot be decrypted individually by the untrusted aggregator 170.

The process 200 continues as each of the clients 104A-104N transmits the ciphertext data 120 corresponding to the encrypted noisy plain text data 116 and the signature of the noisy plain text 122 to the untrusted aggregator 170 of the influencer (block 220). As described above, in a PSA process the untrusted aggregator 170 is not able to decrypt the individual ciphertext data from any one of the clients 104A-104N. Additionally, the untrusted aggregator 170 cannot directly use the signature data 122 with the ciphertext 120 because the signature data 122 applies to the original noisy plaintext data 116 and not to the ciphertext 120. As described below, the untrusted aggregator 170 uses the PSA process and the homomorphic signature system to decrypt the aggregate ciphertext data to obtain aggregate noisy plain text data $x_{agg}$ from all of the clients 104A-104N and to use a sum of all the signatures $\sigma_{agg}$ to verify the authenticity of the contents of $x_{agg}$.

While FIG. 2 depicts a particular order of operation for the clients 104A-104N for explanatory purposes, the generation of the signature 122 and the ciphertext data 120 can occur in any order or concurrently, and each of the clients 104A-104N can transmit the data to the trusted aggregator 150 and the untrusted aggregator 170 as described above with reference the processing of blocks 212 and 220 in any order. While FIG. 2 depicts an embodiment of the process 200 in which the clients 104A-104N transmit the individual ciphertext and signature data to the untrusted aggregator 170 directly using the data network 130, in another embodiment the trusted aggregator 150 receives the ciphertext and signature data and retransmits the ciphertext data and signature data to the untrusted aggregator 170. In either embodiment, the untrusted aggregator 170 receives ciphertext and signature data that are originally transmitted from the clients 104A-104N in a manner that preserves the differential privacy of the clients and that enables the untrusted aggregator 170 to verify the correctness of the aggregate sum of the noisy plaintext data sent from the clients 104A-104N.

Figure 3:
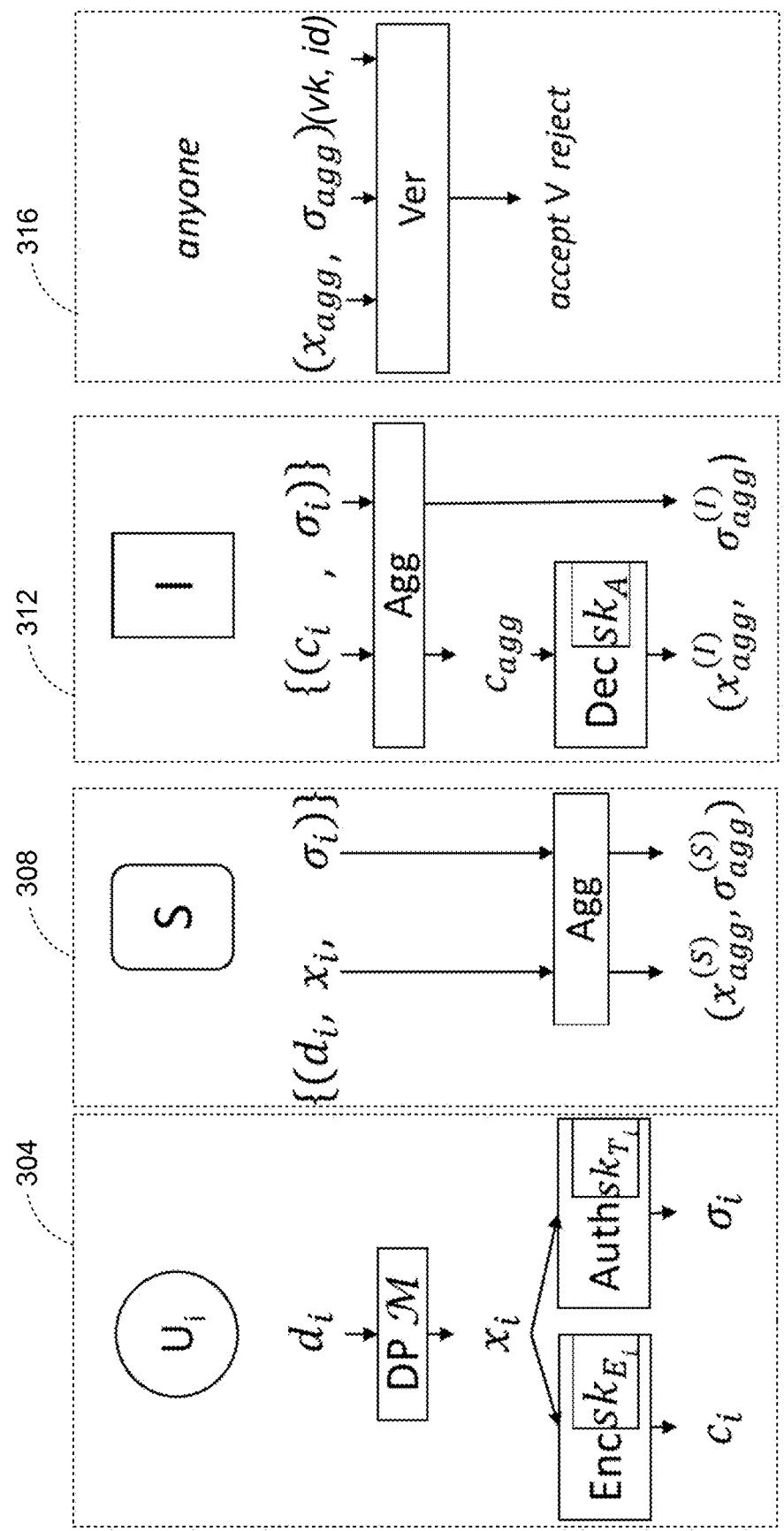
FIG. 3 is a block diagram depicting specific encryption, signature, aggregation, decryption, and verification processes of the process of FIG. 2.

FIG. 3, reference 304 depicts the process that the clients 104A-104N performs to generate the noisy plaintext data $x_i$ from the original plaintext input $d_i$, and encrypting (Enc) and signing (Auth) the noisy plaintext data to generate the ciphertext $c_i$ and the signature $\sigma_i$. As depicted in FIG. 3, the operation of each of the clients 104A-104N corresponds to one of the users $U_i$ that purchased a product from the seller S that operates the trusted aggregator 150 based on the advertising from the influencer I that operates the untrusted aggregator 170.

Referring again to FIG. 2, during the process 200 the trusted aggregator 150 performs addition operations to generate a sum of all the noisy plaintext data and another sum of all the signature data in the plurality of transmissions received from the clients 104A-104N (block 224). As depicted in FIG. 1, the processor 154 in the trusted aggregator 150 executes the stored program instructions 162 to generate a sum of the noisy plaintext data 164 and another sum of the signatures 166 that are stored in the memory 160. While not expressly depicted in FIG. 1, in some embodiments the trusted aggregator 150 also receives the original plaintext data from each of the clients 104A-104N prior to the addition of the noise, although the original plaintext data are not necessary for operation of the process 200. Upon request, the aggregator 150 transmits the aggregate sum of the noisy plaintext data 164 ($x_{agg}$) and the sum of the signatures 166 ($\sigma_{agg}$) to the untrusted aggregator 170 of the influencer I or another third-party for verification. The aggregate sum of the noisy plaintext data 164 preserves the differential privacy of users who operate the individual clients 104A-104N, and the sum of the noisy plaintext signatures 166 enables third-parties to verify the accuracy of the aggregate data $x_{agg}$. The aggregator 150 optionally uses the sum of the noisy plaintext data 164 for consumer analysis and other analytical operations that are not described in further detail herein.

FIG. 3, reference 308 depicts the operation of the trusted aggregator 150 of the seller S in more detail. In FIG. 3, the trusted aggregator receives the noisy plaintext data $x_i$ and the signature $\sigma_i$ from each client. The embodiment of FIG. 3 also depicts the original plaintext data $d_i$ being received from each client. The trusted aggregator 150 performs the aggregation function (Agg) to produce the aggregated sum of the noisy plaintext data $x_{agg}$ and the corresponding sum of the signatures $\sigma_{agg}$.

Referring again to FIG. 2, during the process 200 the untrusted aggregator 170 generates a sum $c_{agg}$ of the individual ciphertexts $c_i$ that are received from the clients 104A-104 and decrypts the sum of the encrypted ciphertexts $c_{agg}$ from the clients 104A-104N to obtain a sum of noisy plaintext data from the clients 104A-104N while preserving differential privacy of the individual clients (block 228). As described above, in a PSA process the untrusted aggregator cannot decrypt the individual ciphertext $c_i$ from an individual client, but the untrusted aggregator can decrypt the aggregate sum $c_{agg}$ of all the ciphertexts. In the untrusted aggregator 170, the processor 174 executes the stored program instructions 182 to generate a sum of ciphertext data 183 ($c_{agg}$) as a sum of all the ciphertexts received from the clients 104A-104N and another sum of the signatures ($\sigma_{agg}$) 186 received from the clients 104A-104N. The processor 174 also executes the stored program instructions 182 to use the homomorphic decryption data 184 to decrypt the sum of the ciphertext data 183 to generate the decrypted sum of the noisy plaintext data ($x_{agg}$) 192 using the PSA processes described above. While the embodiment of the process 200 in FIG. 2 depicts a situation in which the untrusted aggregator 170 receives individual ciphertexts via the data network 130 from the clients 104A-104N either directly or via the trusted aggregator 150, in another configuration the trusted aggregator 150 receives the ciphertext data and the signatures from the clients 104A-104N, generates the sum of the ciphertexts $c_{agg}$ and the signatures $\sigma_{agg}$, and transmits the aggregate ciphertext data $c_{agg}$ and the aggregate signature data $\sigma_{agg}$ to the untrusted aggregator 170. The untrusted aggregator 170 can perform the decryption and verification processes described below using $c_{agg}$ and $\sigma_{agg}$ data from the aggregator 150 to ensure that the aggregator 150 has accurately reported the aggregate ciphertext and signature data from the clients 104A-104N without needing to trust the aggregator 150.

The process 200 continues as the untrusted aggregator 170 verifies the authenticity of the decrypted sum of the noisy plaintext data 192 by adding the individual signatures $\sigma_i$ that are received from each of the clients 104A-104N to generate the sum of signatures 186 ($\sigma_{agg}$) and using the sum of the signatures 186 to verify the authenticity of the decrypted sum of the noisy plaintext data 192 ($x_{agg}$) (block 232). The processor 174 executes the stored program instructions 182 to perform the homomorphic verification process using the sum of the signatures 186 and the homomorphic verification data 188 to verify if the decrypted sum of noisy plaintext data 192 accurately represents the sum of noisy plaintext data that the clients 104A-104N actually transmitted. If the verification process accepts the decrypted sum of noisy plaintext data 192, then the untrusted aggregator 170 can rely upon the aggregate information in the decrypted sum of noisy plaintext data, such as the average age and gender distribution of users who bought the product from the seller. If the verification fails, the untrusted aggregator 170 can determine that at least one of the ciphertexts or signatures received from the clients 104A-104N has been corrupted and rejects the erroneous data. As described above, the homomorphic signature system enables the untrusted aggregator 170 to verify the accuracy of the aggregate sum of the noisy plaintext data 192 using the sum of the signatures 186 without compromising the differential privacy of the clients 104A-104N.

If the untrusted aggregator 170 accepts the sum of noisy plaintext data after successful verification, then the untrusted aggregator 170 uses the decrypted sum of noisy plaintext data in combination with the number of clients that generated the data to identify aggregate statistical information about the users of the clients 104A-104N in one or more categories (block 236). Using the examples described above, the processor 174 in the untrusted aggregator 170 executes the stored program instructions 182 to identify the aggregate statistical information categories including the average age (noisy sum of ages divided by the number of users) and the proportion of female and male users (sum of all numeric gender values divided by the number of users normalized between the two numeric female/male values). The untrusted aggregator 170 determines the number of clients that purchased the product based on the number of unique ciphertext/signature pairs received in fixed-sized batches of communications from a predetermined number of the clients 104A-104N (e.g. 1,000 clients in each batch in one configuration), which enables the untrusted aggregator 170 to determine the number of purchases that the clients 104A-104N made based on the advertising from the influencer I. In another embodiment, each client encodes a noisy plaintext representation of the number of products that were purchased as one piece of information in the ciphertext, which can be useful in situations where a single order for the product potentially specifies a quantity of greater than one item. The untrusted aggregator 170 generates an output of the aggregate plaintext information for analysis by the influencer I and for presentation, with the corresponding aggregate signature data, to third-parties to verify the effectiveness of product advertising conducted by the influencer I. Examples of outputs include, for example, a text or graphical display of the aggregate statistical data the untrusted aggregator 170 generates using a display screen or a web page or other formatted document that the untrusted aggregator 170 transmits a PC, smartphone, or other electronic device that the influencer I uses to review the aggregate statistical information. As described above, since each client generates noisy plaintext to preserve differential privacy, the aggregate statistical information may not exactly correspond to the corresponding statistical values of the exact original plaintext values. However, for a large population of users (e.g. N=1,000 or higher) the random noise added noise to the plaintext generally introduces only a small level of error in the aggregate statistical information of the noisy plaintext.

FIG. 3, reference 312 depicts the operation of the untrusted aggregator 170 of the influencer I in more detail. As depicted in FIG. 3, the untrusted aggregator 170 performs addition to generate the sums of the ciphertexts $c_i$ and the signatures $\sigma_i$ using the aggregation process (Agg). The untrusted aggregator uses the PSA decryption process (Dec using the homomorphic decryption key data $sk_A$) to decrypt the aggregate ciphertext $c_{agg}$ that generates the decrypted sum of noisy plaintext data ($x_{agg}$) 192.

During the process 200, the untrusted aggregator 170 or a third-party computing device can also verify the accuracy of the aggregate data that is published by the aggregator 150 or the untrusted aggregator 170 (block 240). Once again, the "trusted" aggregator 150 trusted by the clients 104A-104N but not by the untrusted aggregator 170 or other third parties. If the aggregator 150 generates honest results, then the sum of noisy plaintext data 164 generated by the aggregator 150 should match the actual noisy plaintext sum of all transmitted messages from the clients 104A-104N and the decrypted sum of noisy plaintext data 192 assuming successful verification during the process 200. Similarly, the sum of signatures 166 generated by the aggregator 150 should match the actual sum of signatures transmitted from the clients 104A-104N and the sum of signatures 186 generated by the untrusted aggregator 170. In one embodiment, the untrusted aggregator 170 that has already decrypted and internally verified the accuracy of the decrypted sum of noisy plaintext data 192 compares the verified result of $x_{agg\_verified}$ to the corresponding data $x_{agg\_untrusted}$ from the aggregator 150 to ensure that the values match to verify the accuracy of the information distributed from the aggregator 150, and optionally compares the aggregate signatures to ensure that they are also identical.

In another embodiment, the untrusted aggregator 170 or a third party performs the verification process using the homomorphic signature system to ensure that the published signatures $\sigma_{agg}$ actually successfully verify the published value of $x_{agg}$ to verify the accuracy of the output from the aggregator 150. Because the value of $\sigma_{agg}$ is the sum of each of the signatures $\sigma_i$ that can only be generated by the clients 104A-104N and neither the aggregator 150 nor the untrusted aggregator 170, any third party with access to the appropriate signature verification data such as the public keys $vk_i$ can also use the homomorphic signature system to verify the accuracy of the value of $x_{agg}$ using the aggregate signature $\sigma_{agg}$. As such, the output of the aggregator 150 is unforgeable since any corruption of sum of noisy plaintext data 164 or the sum of signatures 166 is detected during the verification process. The same verification process is also applicable to communications between the untrusted aggregator 170 and third party computing systems that verify the accuracy of the decrypted sum of noisy plaintext output data 192 from the untrusted aggregator using the sum of signatures 186 and the publicly available verification data, and once again the output of the untrusted aggregator 170 is also unforgeable. For example, in one embodiment the aggregator 150 acts as a third party that verifies the output of the untrusted aggregator 170 in the manner described above.

Figure 4:
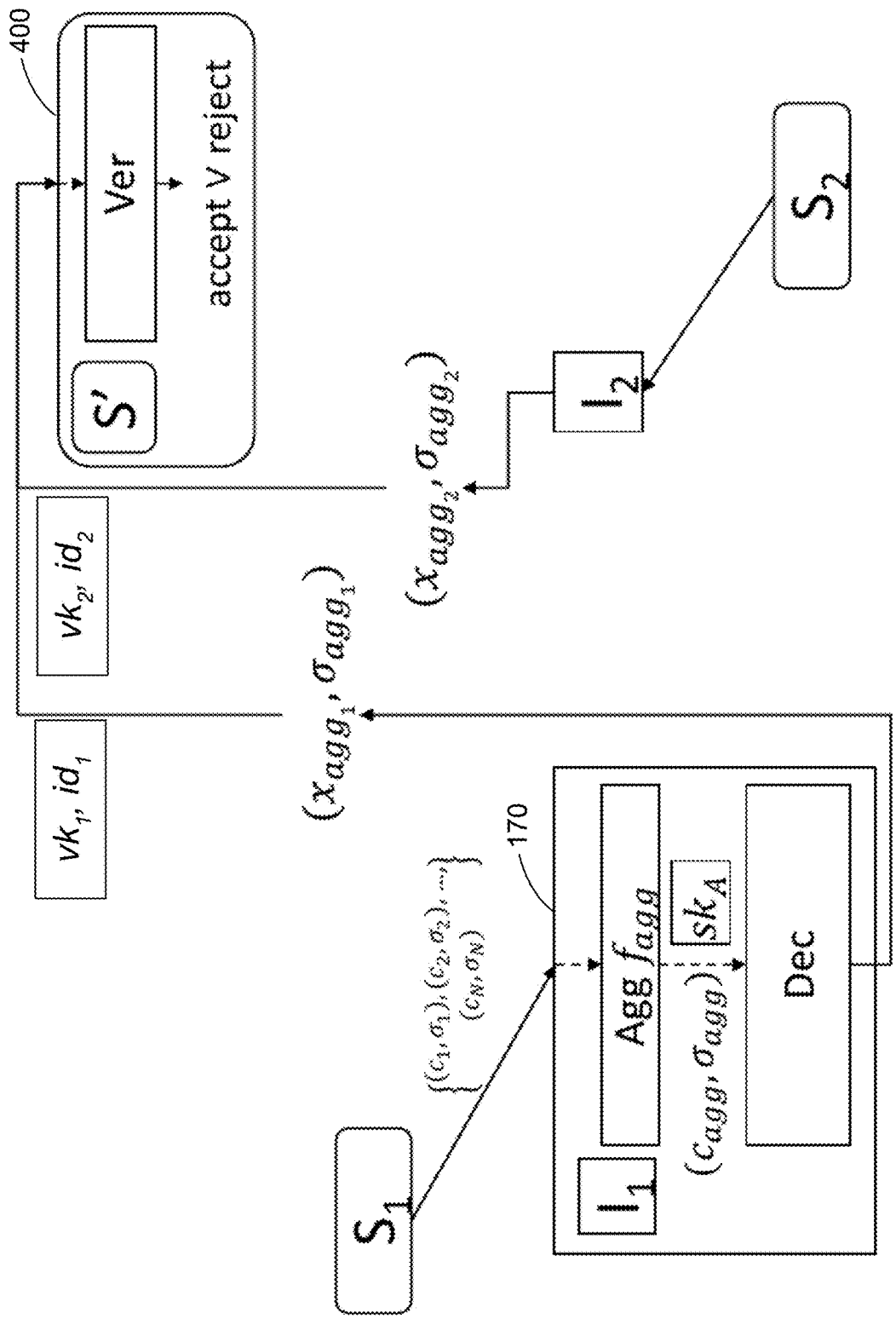
FIG. 4 is a block diagram depicting third-party verification of aggregate data using aggregate signatures in a homomorphic signature system in the process of FIG. 2.

FIG. 3, reference 316 and FIG. 4 depict the verification process in more detail. As depicted in FIG. 3, the untrusted aggregator 170 and third parties ("anyone") can use the homomorphic signature system to perform the verification process (Ver) when provided with the sum of the noisy plaintext data $x_{agg}$, the sum of the signatures $\sigma_{agg}$, and the verification data including the public keys $vk_i$ corresponding to the clients 104A-104N that generated the signatures and the nonce identifier id. FIG. 4 depicts a similar process for the output of the untrusted aggregator 170 in which a third-party computing system 400, which is operated by another seller S' in the example of FIG. 4, verifies the outputs of the influencer $I_1$ that operates the untrusted aggregator 170 and optionally the outputs of another influencer $I_2$.

Figure 5:
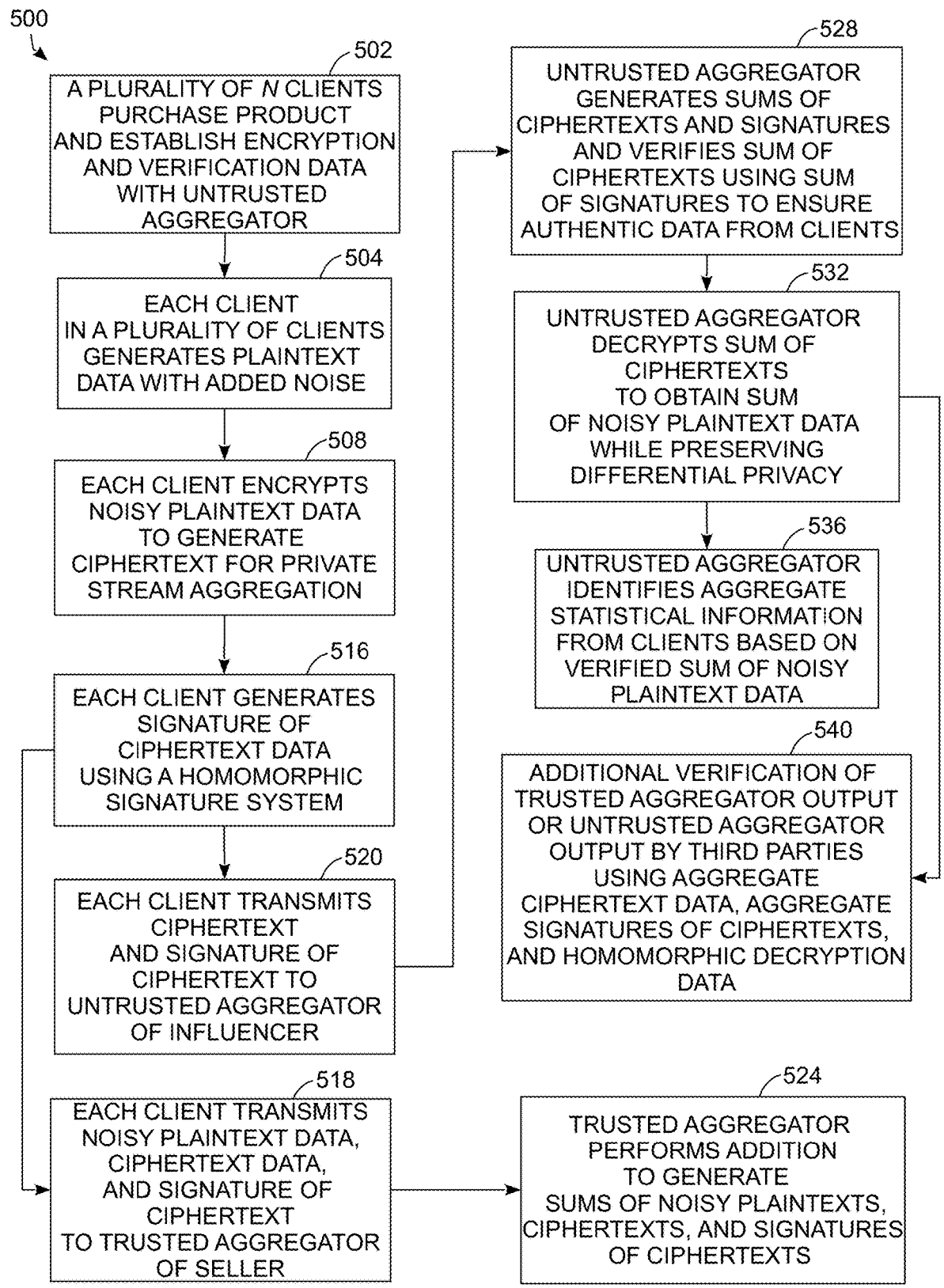
FIG. 5 is a block diagram of another embodiment of a process for operation of an e-commerce system that uses private stream aggregation and a homomorphic signature system to preserve the differential privacy of users who purchase products while enabling an aggregator of an influencer to verify the accuracy of aggregate statistical information about users.

As described above, the in the process 200 the clients 104A-104N each use a homomorphic signature system to generate signature data 122 of the noisy plaintext data 116 that enables verification of a sum of all the noisy plaintext messages that are sent from a group of clients. FIG. 5 depicts a block diagram of another process 500 for operation of an e-commerce system that uses PSA in which the clients use the homomorphic signature system to generate the signatures of the ciphertext data instead of the noisy plaintext data of the process 200. The process 500 can also be performed by the system 100 of FIG. 1. The process 500 also preserves the differential privacy of users who purchase products while enabling an influencer to verify the accuracy of data provided by the seller. The process 500 is described in conjunction with the system 100 of FIG. 1 and additional diagrams in FIG. 6 and FIG. 7 for illustrative purposes.

The process 500 begins as a plurality of N clients 104A-104N (e.g. N=1000 although larger or smaller groups can be used) purchases the product from the seller and establish encryption and signature verification data with the untrusted aggregator 170 (block 502). The process 500 continues as each of the clients 104A-104N generates plaintext data with added noise data for transmission to the trusted aggregator 150 (block 504). The process 500 continues as each of the clients 104A-104N encrypts the noisy plaintext data to generate ciphertext using the PSA processes described above, including the PQ-PSA embodiment and other PSA embodiments (block 508). The processing of blocks 502, 504, and 508 in the process 500 occurs in a similar manner to that described above with reference to blocks 202, 204, and 216, respectively, in the process 200.

During the process 500, each of the clients generates a signature of the ciphertext data $c_i$ (block 516). Using the client 104A as an example, the processor 108 executes the stored program instructions 114 to generate a signature of the ciphertext data 120 using the homomorphic signature data 119 in the homomorphic signature system. The client 104A generates the signature in a similar manner to the generation of the signature for the noisy plaintext data as is described above in the processing of block 208 in the process 200, but in the process 500 each of the clients 104A-104N generates the signature for the ciphertext data instead of the noisy plaintext data. Generating a signature for the ciphertext data ensures that the data of the signature itself cannot be used to infer information about the original noisy plaintext data since the signature process never directly processes the noisy plaintext data.

The process 500 continues as each of the clients 104A-104N transmits the noisy plaintext data, the ciphertext data, and the signature of the ciphertext data to the trusted aggregator 150 (block 518). As described above, the clients 104A-104N trust the aggregator 150 and transmit noisy plaintext data (and optionally the original plaintext data) to the trusted aggregator 150 of the seller. The trusted aggregator 150 also receives the ciphertext data and the signature of the ciphertext data to use in providing a proof of a verification process for the sum of the noisy plaintext data to enable the untrusted aggregator 170 or another third party that does not trust the aggregator 150 of the seller to verify that a sum of the noisy plaintext data generated by the aggregator 150 is accurate.

During the process 500, each of the clients 104A-104N transmits the ciphertext data, and the signature of the ciphertext data to the untrusted aggregator 170 (block 520). As described above, the untrusted aggregator 170 does not receive the noisy plaintext data from any individual client and cannot decrypt an individual ciphertext from any one of the clients 104A-104N. During the process 500, each of the clients 104A-104N can transmit data to the trusted aggregator 150 and to the untrusted aggregator 170 as described above with reference to the processing of blocks 518 and 520 in any order.

Figure 6:
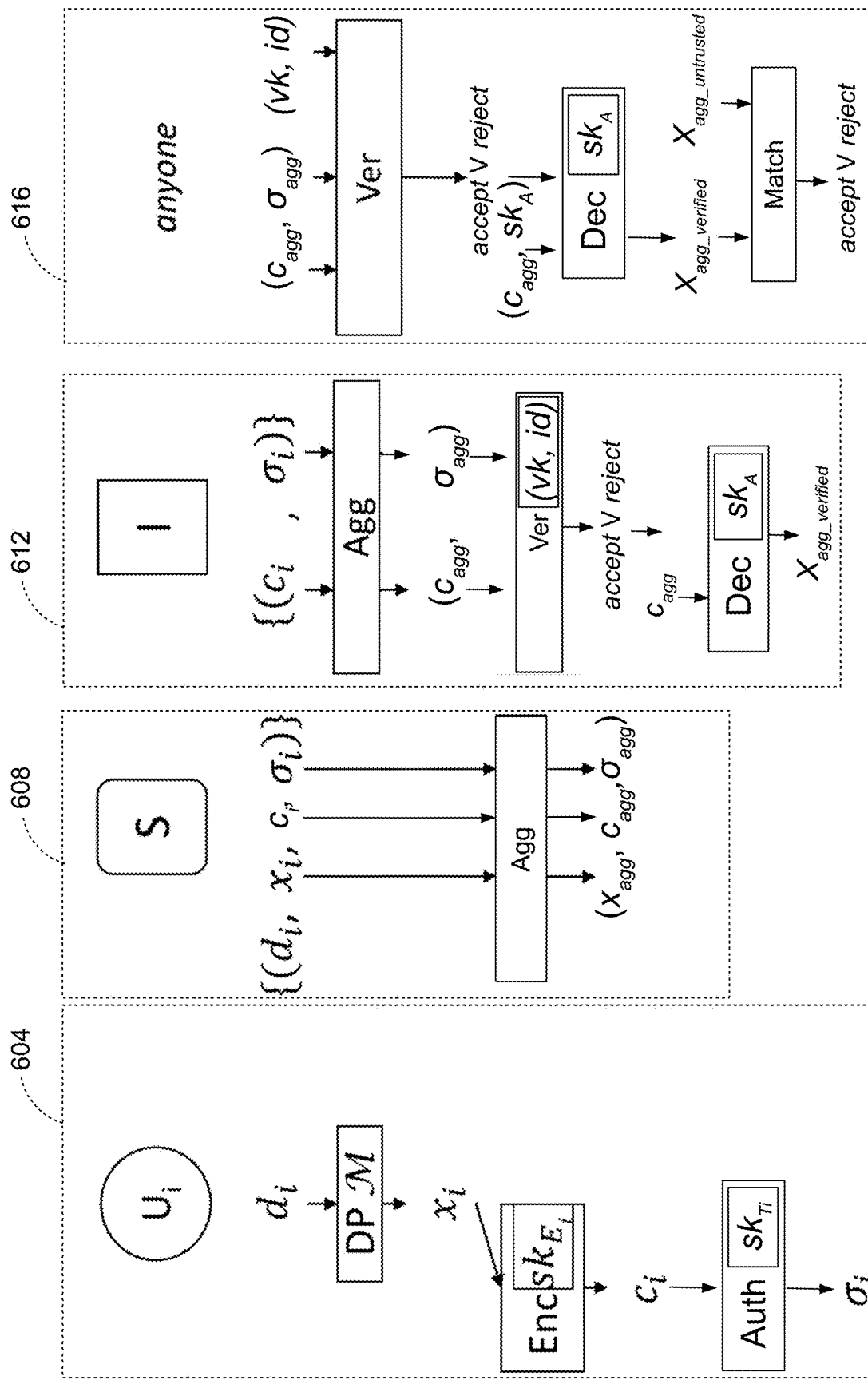
FIG. 6 is a block diagram depicting specific encryption, signature, aggregation, decryption, and verification processes of the process of FIG. 5.

FIG. 6, reference 604 depicts the operation of one of the clients 104A-104N for a user $U_i$ during the process 500. As depicted in FIG. 6, the client 104 generates the original plaintext data $d_i$ and applies the noise (DP) to generate noisy plaintext data $x_i$. The client then uses the homomorphic encryption function (Enc) to generate the ciphertext $c_i$ and uses the signature function (Auth) to generate the signature $\sigma_i$ of the ciphertext data.

Referring again to FIG. 5, the trusted aggregator 150 generates sums of the noisy plaintext data ($x_{agg}$), the ciphertext data ($c_{agg}$), and the signatures of the ciphertext data ($\sigma_{agg}$) (block 524). As described above, the trusted aggregator 150 of the seller uses the sums of the noisy plaintext data for additional analysis of aggregate statistical information about the users, such as analyzing the average age and gender distribution of users who purchase a product. The trusted aggregator 150 does not need to decrypt the sum of the ciphertexts $\sigma_{agg}$ since the clients 104A-104N transmit the noisy plaintext data to the trusted aggregator 150 directly. However, the trusted aggregator 150 provides the sum of the ciphertexts $c_{agg}$ and the sums of the signatures of the ciphertexts $\sigma_{agg}$ as proof of the accuracy of the contents of $x_{agg}$ during a verification process performed by the untrusted aggregator 170 or another third party.

FIG. 6, reference 608 depicts the operation of the trusted aggregator 150 of the seller S in more detail. The trusted aggregator 150 aggregates (Agg) the noisy plaintext data $x_i$, ciphertext $c_i$, and the signature of the ciphertext $\sigma_i$ from all of the clients 104A-104N to generate the aggregate sums of the noisy plaintext data $x_{agg}$, ciphertext data $c_{agg}$, and the signatures of the ciphertexts $\sigma_{agg}$.

Referring again to FIG. 5, during process 500, the untrusted aggregator 170 generates and verifies the sum of the ciphertexts that are received from the clients 104A-104N using the sum of the signatures that are received from the clients 104A-104N (block 528). In the untrusted aggregator 170, the processor 174 executes the stored program instructions 182 to generate the sum of the ciphertext data 183 and the sum of the signatures 186. The processor 174 further uses the homomorphic signature system with the homomorphic verification data 188 including the public verification keys of the clients 104A-104N to verify that the sum of the ciphertext data 183 corresponds to the sum of signatures 186. Once again, the additive homomorphic properties of the homomorphic signature system enable the untrusted aggregator 170 to verify the validity of the sum of the ciphertexts using the sum of the signatures. If the verification process fails then the untrusted aggregator 170 rejects the ciphertext data and does not proceed further with the process 500.

If the verification process succeeds, then the untrusted aggregator 170 decrypts the sum of the ciphertext data using the homomorphic decryption data 184 to obtain a sum of the noisy plaintext data from all of the clients 104A-104N while preserving the differential privacy of the individual clients (block 532). The untrusted aggregator 170 performs the decryption process in PSA in a similar manner to the decryption process that is described above with reference to the processing of block 228 in the process 200. The untrusted aggregator 170 then identifies aggregate statistical information from the clients 104A-104N based on the sum of noisy plaintext data, which is considered to be a verified sum since the noisy plaintext data are decrypted from the previously verified sum of the ciphertext data (block 536). The untrusted aggregator 170 identifies the aggregate statistical information from the clients 104A-104N in a similar manner to the processing of block 236 in the process 200.

FIG. 6, reference 612 depicts the verification operation of the untrusted aggregator 170 in more detail. The untrusted aggregator 170 receives the input ciphertexts $c_i$ and signatures of the ciphertexts $\sigma_i$ and generates the sum (Agg) of ciphertexts $c_{agg}$ and the sum of signatures $\sigma_{agg}$. The untrusted aggregator then uses the homomorphic signature system to verify (Ver) $c_{agg}$ using $\sigma_{agg}$ and the homomorphic verification data 188 including the public verification keys vk of the clients 104A-104N and the nonce identifier id. If the verification succeeds and the untrusted aggregator 170 accepts the output, then the untrusted aggregator 170 decrypts (Dec) $c_{agg}$ in the PSA process using the homomorphic decryption data 184 ($sk_A$) to obtain $x_{agg\_verified}$, which is the verified sum of the noisy plaintext data from all of the clients 104A-104N.

Referring again to FIG. 5, during the process 500, the untrusted aggregator 170 or a third-party computing device can also verify the accuracy of the aggregate data that is published by the aggregator 150 or the untrusted aggregator 170 (block 540). Once again, the "trusted" aggregator 150 is trusted by the clients 104A-104N but not by the untrusted aggregator 170 or other third parties. In the process 500, the untrusted aggregator 170 receives the sum of noisy plaintext data ($x_{agg\_untrusted}$), the sum of the ciphertexts ($c_{agg}$), and the sum of the signatures ($\sigma_{agg}$) from the trusted aggregator 150 and performs the same verification of the sum of the ciphertext data that is described above with reference to the processing in block 528, although in this process the trusted aggregator 150 generates the sum of the ciphertext data. If the verification of the sum of the ciphertext data succeeds, then the untrusted aggregator processor 174 accepts the validity of $c_{agg}$ (although not necessarily $x_{agg\_untrusted}$) and uses the homomorphic decryption data 184 to decrypt $c_{agg}$ in a similar manner to that described above with described above with reference to the processing in block 532. The decryption produces a verified sum of noisy plaintext data $x_{agg\_verified}$ in addition to the sum of noisy plaintext data $x_{agg\_untrusted}$ that the aggregator 150 transmitted to the untrusted aggregator 170. The processor 174 in the untrusted aggregator 170 then executes the stored program instructions 182 to compare the value of $x_{agg\_untrusted}$ to $x_{agg\_verified}$. If the two values match then the untrusted aggregator 170 accepts the validity of $x_{agg\_untrusted}$, but if the two values do not match then the untrusted aggregator 170 rejects $x_{agg\_untrusted}$.

A third-party computing device can perform the same verification process using $x_{agg\_untrusted}$, $c_{agg}$, and $\sigma_{agg}$ in configurations in which the third-party computing device is also provided with both the homomorphic verification data 188 and the homomorphic decryption data 184 that are stored in the memory 180 of the untrusted verifier 170. As described above, the homomorphic verification data 188 includes public verification keys $vk_i$ of the clients 104A-104N and the nonce identifier that a third-party can receive from the untrusted aggregator 170 or from another source and that cannot be altered by the untrusted aggregator 170 without causing the verification process to fail. In the PSA process, the homomorphic decryption data 184 enables the third-party computing system to decrypt $c_{agg}$ while preserving the differential privacy of the individual clients 104A-104N in the same manner that the homomorphic decryption data 184 that is provided to the untrusted aggregator 170 prevents the untrusted aggregator 170 from identifying the noisy plaintext data of any of the individual clients 104A-104N.

Figure 7:
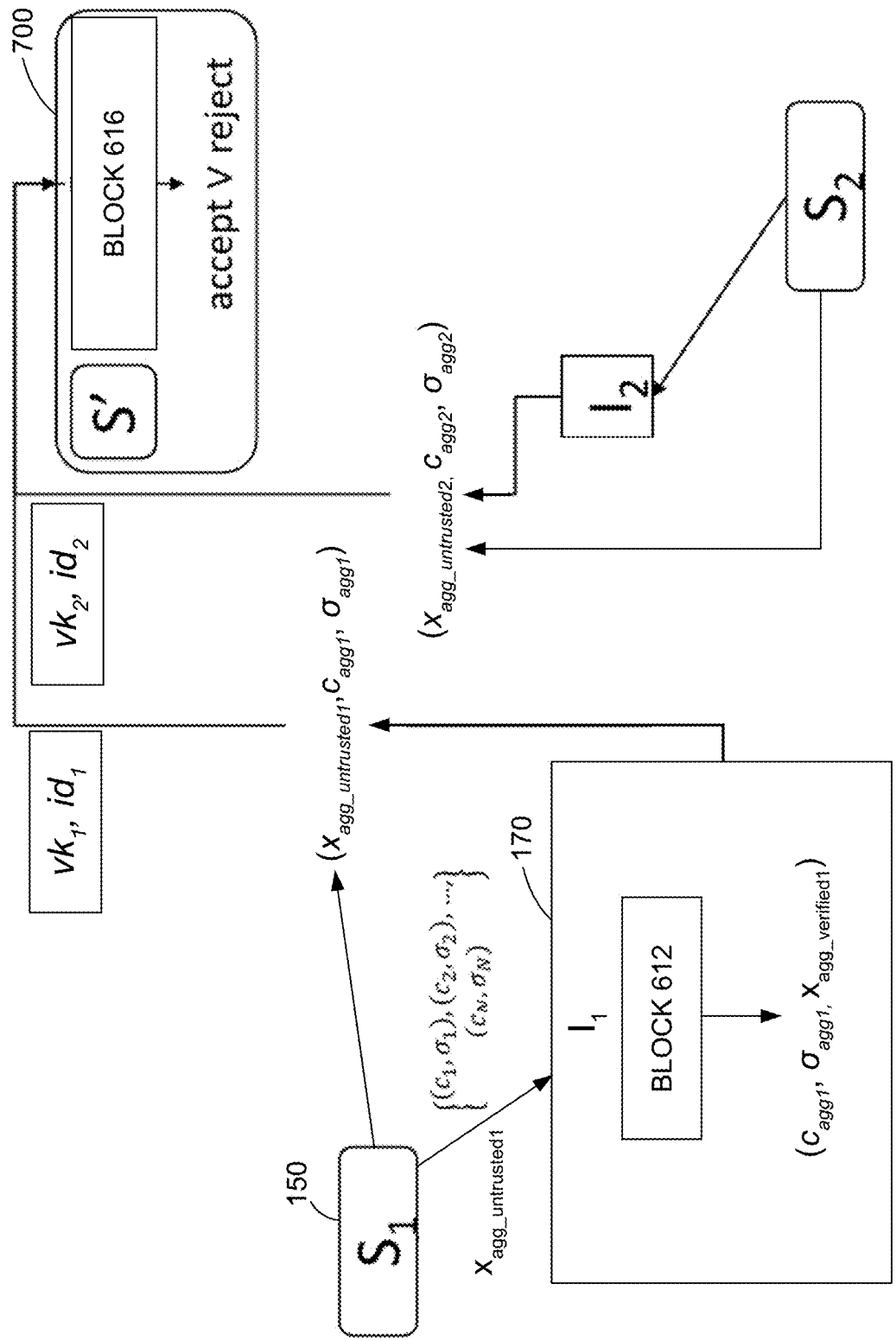
FIG. 7 is a block diagram depicting third-party verification of aggregate data using aggregate signatures in a homomorphic signature system in the process of FIG. 5.
Figure 8:
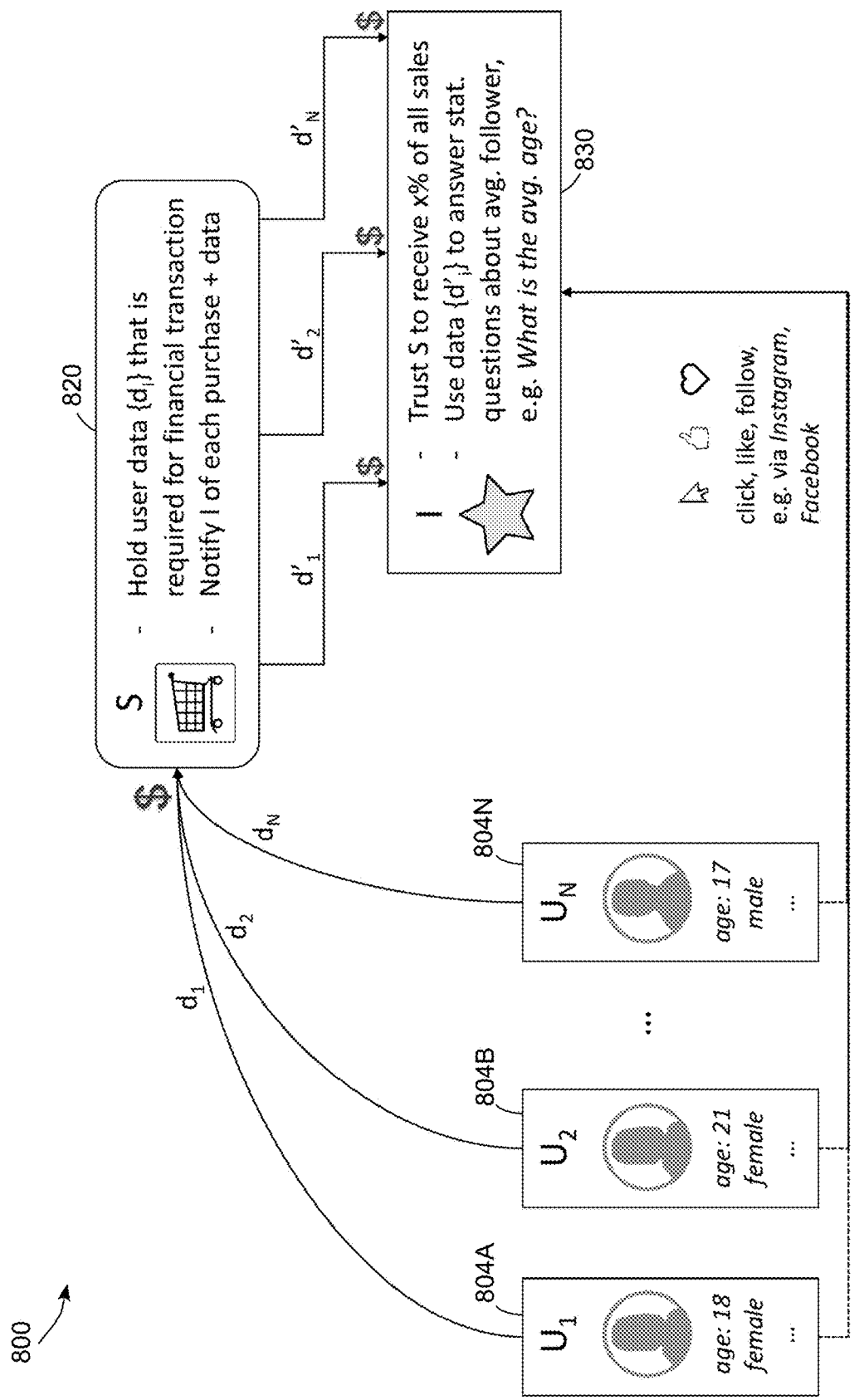
FIG. 8 is a schematic diagram of a prior-art electronic commerce system.

FIG. 6, reference 616 and FIG. 7 depict the third-party verification process in more detail. The third-party verifier 700 receives the untrusted sum of noisy plaintext data $x_{agg\_untrusted}$ along with $c_a$ and $\sigma_a$ and performs verification (Ver) in the homomorphic signature system using public verification keys vk and the nonce identifier id. If the verification process accepts the aggregate ciphertext $c_{agg}$, then the third-party verifier 700 decrypts $c_{agg}$ to generate $x_{agg\_verified}$ using homomorphic decryption data $sk_A$ from the untrusted aggregator 170. The third-party verifier 700 compares the values of $x_{agg\_verified}$ with $x_{agg\_untrusted}$ to determine if the values match (Match) and accepts $x_{agg\_untrusted}$ if the values match or rejects $x_{agg\_untrusted}$ if the values do not match. As depicted in FIG. 7, the third-party verifier 700 can verify the untrusted aggregate noisy plaintext data from the untrusted aggregator 170, the aggregator 150, which is not trusted by the third-party 700, or from other untrusted sources.

The following table presents run time results, in milliseconds, for various operations performed by the clients 104A-104N, the trusted aggregator 150, and the untrusted aggregator 170 in an embodiment of the system 100 that performs the process 200 for N=1,000 clients using PQ-PSA for noisy plaintext values in an approximately 16-bit ($2^{16}$) numeric range while providing an 80-bit equivalent level of security to ciphertexts transmitted from the clients. In the following table, M represents the amount of time required to generate a noisy plaintext data in a message M, which is combined with the time to encrypt the message (Enc) by one of clients 104A-104N, and the time (Auth) required for each client to generate the signature for the noisy plaintext in the homomorphic signature system. The trusted aggregator 150 that receives noisy plaintext data and signatures from the clients implements the aggregation function (Agg). The untrusted influencer 170 that receives ciphertext data and signatures from the clients performs both the aggregation (Agg) and the decryption of aggregate ciphertext in the PQ-PSA process. Finally, the verification process (Ver) can be performed by any of the systems or a third party.

TABLE 1

| | Time of operations (msec) | | | | | | |
|---|---|---|---|---|---|---|---|
| | M | Enc | Auth | Dec | Agg | Total | Ver |
| User (client 104) | 3.72 | 15.4 | — | — | | 19.12 | 3.1 |
| Merchant (aggregator 150) | — | — | — | — | 0.02 | 0.02 | |
| Influencer (aggregator 170) | — | — | — | 1.96 | | 1.96 | |

The embodiments described herein provide specific improvements to the operation of computerized e-commerce systems that improve the privacy of customer data and enable verification between influencers and sellers, which overcomes technological problems that exist in the art. In particular, the embodiments described herein conceal each individual user's privacy-sensitive information to the highest extent possible. Therefore data storage in the context of online shopping is limited to the absolute minimum, i.e. only in the actual seller's database, and ensures transparency for the user. In consequence, the risk of data breaches and exposure of privacy-sensitive information is also kept to a minimum. Additionally, the embodiments described herein do not require the involved parties have to sacrifice functionality: the user enjoys her usual shopping experience regardless of which channel she chooses in order to make a purchase. The seller is free to work with social media marketers or sell directly to the end user and retains the customer data that is necessary to adapt his marketing strategy. The influencer, e.g. a blogger, has a detailed and complete picture of his follower base and can provide full-fledged marketing services to sellers in order to generate revenue. Additionally, as described above the embodiments herein enable the computing systems of both the influencer and third parties to prove the correctness of all statistics that are provided through the aggregation system. Therefore, advertisers can rely on the collected information and intermediate marketers can provide unforgeable proof of their social media impact that can be verified by anyone, i.e. publicly.

It will be appreciated that variants of the above-described and other features and functions, or alternatives thereof, may be desirably combined into many other different systems, applications, or methods. Various presently unforeseen or unanticipated alternatives, modifications, variations or improvements may be subsequently made by those skilled in the art that are also intended to be encompassed herein in the following claims.

What is claimed:

1. A method for operating an aggregator in an electronic commerce system, the method comprising:
    receiving, with a network interface in the aggregator, a plurality of ciphertexts and a plurality of signatures transmitted from a plurality of clients, each ciphertext in the plurality of ciphertexts including encrypted data corresponding to noisy plaintext data of a category of information for a user that purchased a product, and each signature in the plurality of signatures corresponding to a ciphertext in the plurality of ciphertexts;
    generating, with a processor in the aggregator, a first sum of the plurality of ciphertexts;
    generating, with the processor in the aggregator, a first sum of the plurality of signatures;
    verifying, with the processor in the aggregator, the first sum of the plurality of ciphertexts with a homomorphic signature system based on the first sum of the plurality of signatures and homomorphic verification data stored in a memory of the aggregator;
    decrypting, with the processor in the aggregator, the first sum of the plurality of ciphertexts in a private stream aggregation (PSA) process based on homomorphic decryption data stored in the memory of the aggregator to generate a first sum of noisy plaintext data in response to a success of the verification; and
    identifying, with the processor in the aggregator, aggregate statistical information transmitted from the plurality of clients based on the first sum of noisy plaintext data while preserving differential privacy of the plurality of clients.

2. The method of claim 1 further comprising:
    rejecting, with the processor in the aggregator, the first sum of the plurality of ciphertexts in response to a failure of verification of the first sum of the plurality of ciphertexts indicating that at least one ciphertext in the first plurality of ciphertexts or at least one signature in the first plurality of signatures is invalid.

3. The method of claim 1 wherein the homomorphic verification data stored in the memory further include a plurality of public keys corresponding to the plurality of clients.

4. The method of claim 1 further comprising:
    receiving, with the network interface in the aggregator, a second sum of noisy plaintext data corresponding to a plurality of noisy plaintext data transmitted from the plurality of clients, a second sum of a plurality of ciphertexts, and a second sum of a plurality of signatures from another aggregator of a seller;
    verifying, with the processor in the aggregator, the second sum of the plurality of ciphertexts with the homomorphic signature system based on the second sum of the plurality of signatures and the homomorphic verification data stored in the memory of the aggregator;

decrypting, with the processor in the aggregator, the second sum of the plurality of ciphertexts in the PSA process based on the homomorphic decryption data stored in the memory of the aggregator to generate a third sum of noisy plaintext data in response to a success of verification of the second sum of the plurality of ciphertexts; and verifying the second sum of noisy plaintext data from the aggregator of the seller by only in response to the second sum of noisy plaintext data matching the third sum of noisy plaintext data.

5. The method of claim 4 further comprising:

rejecting, with the processor in the aggregator, the second sum of the plurality of ciphertexts in response to a failure of verification of the second sum of the plurality of ciphertexts indicating that at least one ciphertext in the second plurality of ciphertexts or at least one signature in the second plurality of signatures is invalid; and rejecting, with the processor in the aggregator, the second sum of noisy plaintext data in response to the second sum of noisy plaintext data not matching the third sum of noisy plaintext data.

6. The method of claim 1 wherein the plurality of clients do not trust the aggregator and the aggregator is incapable of decrypting any individual ciphertext in the plurality of ciphertexts.

7. An aggregator in an electronic commerce system, the aggregator comprising:

a network interface configured to receive data via a data network;

a memory; and a processor operatively connected to the network interface and the memory, the processor being configured to:

receive a plurality of ciphertexts and a plurality of signatures transmitted from a plurality of clients with the network interface, each ciphertext in the plurality of ciphertexts including encrypted data corresponding to noisy plaintext data of a category of information for a user that purchased a product, and each signature corresponding to a ciphertext in the plurality of ciphertexts;

generate a first sum of the plurality of ciphertexts;

generate a first sum of the plurality of signatures;

verify the first sum of the plurality of ciphertexts with a homomorphic signature system based on the first sum of the plurality of signatures and homomorphic verification data stored in a memory of the aggregator;

decrypt the first sum of the plurality of ciphertexts in a private stream aggregation (PSA) process based on homomorphic decryption data stored in the memory of the aggregator to generate a first sum of noisy plaintext data in response to a success of the verification; and identify aggregate statistical information transmitted from the plurality of clients based on the first sum of noisy plaintext data while preserving differential privacy of the plurality of clients.

8. The aggregator of claim 7, the processor being further configured to:

reject the first sum of the plurality of ciphertexts in response to a failure of verification of the first sum of the plurality of ciphertexts indicating that at least one ciphertext in the first plurality of ciphertexts or at least one signature in the first plurality of signatures is invalid.

9. The aggregator of claim 7 wherein the homomorphic verification data stored in the memory further include a plurality of public keys corresponding to the plurality of clients.

10. The aggregator of claim 7, the processor being further configured to:

receive a second sum of noisy plaintext data corresponding to a plurality of noisy plaintext data transmitted from the plurality of clients, a second sum of a plurality of ciphertexts, and a second sum of a plurality of signatures from another aggregator of a seller with the network interface;

verify the second sum of the plurality of ciphertexts with the homomorphic signature system based on the second sum of the plurality of signatures and the homomorphic verification data stored in the memory of the aggregator;

decrypt the second sum of the plurality of ciphertexts in the PSA process based on the homomorphic decryption data stored in the memory of the aggregator to generate a third sum of noisy plaintext data in response to a success of verification of the second sum of the plurality of ciphertexts; and verify the second sum of noisy plaintext data from the aggregator of the seller by only in response to the second sum of noisy plaintext data matching the third sum of noisy plaintext data.

11. The aggregator of claim 10, the processor being further configured to:

reject the second sum of the plurality of ciphertexts in response to a failure of verification of the second sum of the plurality of ciphertexts indicating that at least one ciphertext in the second plurality of ciphertexts or at least one signature in the second plurality of signatures is invalid; and reject the second sum of noisy plaintext data in response to the second sum of noisy plaintext data not matching the third sum of noisy plaintext data.

12. The aggregator of claim 7 wherein the plurality of clients do not trust the aggregator and the aggregator is incapable of decrypting any individual ciphertext in the plurality of ciphertexts.

13. A method for operating an aggregator in an electronic commerce system, the method comprising:

receiving, with a network interface in the aggregator, a plurality of ciphertexts and a plurality of signatures transmitted from a plurality of clients, each ciphertext encrypting noisy plaintext data of a category of information for a user that purchased a product, and each signature corresponding to noisy plaintext data that are encrypted in each ciphertext in the plurality of ciphertexts;

generating, with a processor in the aggregator, a sum of the plurality of ciphertexts;

generating, with the processor in the aggregator, a first sum of the plurality of signatures;

decrypting, with the processor in the aggregator, the sum of the plurality of ciphertexts in a private stream aggregation (PSA) process based on homomorphic decryption data stored in a memory of the aggregator to generate a first sum of noisy plaintext data;

verifying, with the processor in the aggregator, the first sum of noisy plaintext data with a homomorphic signature system based on the first sum of the plurality of signatures and homomorphic verification data stored in the memory of the aggregator; and identifying, with the processor in the aggregator, aggregate statistical information transmitted from the plurality of clients based on the first sum of noisy plaintext data while preserving differential privacy of the plurality of clients.

14. The method of claim 13 further comprising:

rejecting, with the processor in the aggregator, the first sum of noisy plaintext data in response to a failure of verification of the first sum of noisy plaintext data indicating that at least one ciphertext in the plurality of ciphertexts or at least one signature in the plurality of signatures is invalid.

15. The method of claim 13 wherein the homomorphic verification data stored in the memory further include a plurality of public keys corresponding to the plurality of clients.

16. The method of claim 13 further comprising:

receiving, with the network interface in the aggregator, a second sum of noisy plaintext data from another aggregator of a seller;

receiving, with the network interface in the aggregator, a second sum of signatures corresponding to the second sum of noisy plaintext data from the other aggregator of the seller; and verifying, with the processor in the aggregator, the second sum of noisy plaintext data with the homomorphic signature system based on the second sum of the plurality of signatures and the homomorphic verification data stored in the memory of the aggregator.

* * * * *